United States Patent
Peters et al.

(10) Patent No.: US 12,427,438 B2
(45) Date of Patent: Sep. 30, 2025

(54) DISTILLATION APPARATUS

(71) Applicant: Clean Water Designs Ltd, Edinburgh (GB)

(72) Inventors: Duncan Peters, Edinburgh (GB); Constantine Talalaev, Edinburgh (GB)

(73) Assignee: CLEAN WATER DESIGNS LTD, Edinburgh (GB)

( * ) Notice: Subject to any disclaimer, the term of this patent is extended or adjusted under 35 U.S.C. 154(b) by 125 days.

(21) Appl. No.: 17/914,076

(22) PCT Filed: Mar. 25, 2021

(86) PCT No.: PCT/EP2021/057857
§ 371 (c)(1),
(2) Date: Sep. 23, 2022

(87) PCT Pub. No.: WO2021/191402
PCT Pub. Date: Sep. 30, 2021

(65) Prior Publication Data
US 2023/0124058 A1    Apr. 20, 2023

(30) Foreign Application Priority Data
Mar. 25, 2020 (GB) .................................... 2004347

(51) Int. Cl.
*B01D 1/08* (2006.01)
*B01D 1/02* (2006.01)
(Continued)

(52) U.S. Cl.
CPC ................ *B01D 1/08* (2013.01); *B01D 1/02* (2013.01); *B01D 1/28* (2013.01); *B01D 3/007* (2013.01);
(Continued)

(58) Field of Classification Search
CPC ... B01D 1/08; B01D 1/02; B01D 1/28; B01D 1/2887; B01D 1/2893; B01D 3/007; B01D 5/006; B01D 5/0039; C02F 1/041
See application file for complete search history.

(56) References Cited

U.S. PATENT DOCUMENTS

2004/0099521 A1   5/2004   Demers et al.
2008/0083605 A1*  4/2008   Holtzapple ............... B01D 1/28
                                                          239/398
(Continued)

FOREIGN PATENT DOCUMENTS

WO    2020/065311 A1    4/2020

OTHER PUBLICATIONS

International Search Report for International Application No. PCT/EP2021/057857 dated Jun. 25, 2021.
(Continued)

*Primary Examiner* — Renee Robinson
(74) *Attorney, Agent, or Firm* — Harness, Dickey & Pierce, P.L.C.

(57) ABSTRACT

The present disclosure relates to distillation apparatus, especially such apparatus that may be deployed within a commercial, domestic or near-Domestic situation to provide distilled water on demand. The distillation apparatus comprising an evaporation chamber, a condensation chamber, a heat source, the heat source being arranged to supply heat to at least part of the evaporation chamber, a fluid inlet, a fluid outlet, and a vapour compression pump, wherein the condensation chamber surrounds at least part of the evaporation chamber.

21 Claims, 16 Drawing Sheets

(51) Int. Cl.
  *B01D 1/28*   (2006.01)
  *B01D 3/00*   (2006.01)
  *B01D 3/10*   (2006.01)
  *B01D 5/00*   (2006.01)
  *C02F 1/04*   (2023.01)

(52) U.S. Cl.
  CPC ............... *B01D 3/10* (2013.01); *B01D 5/006* (2013.01); *C02F 1/041* (2013.01); *C02F 1/046* (2013.01)

(56) References Cited

U.S. PATENT DOCUMENTS

| | | |
|---|---|---|
| 2012/0006670 A1 | 1/2012 | Kamen et al. |
| 2020/0179820 A1* | 6/2020 | Kim .................... B01D 5/0063 |

OTHER PUBLICATIONS

Written Opinion for International Application No. PCT/EP2021/057857 dated Jun. 25, 2021.
Examination Report dated Dec. 20, 2023 issued in European patent application No. 21718802.8.

* cited by examiner

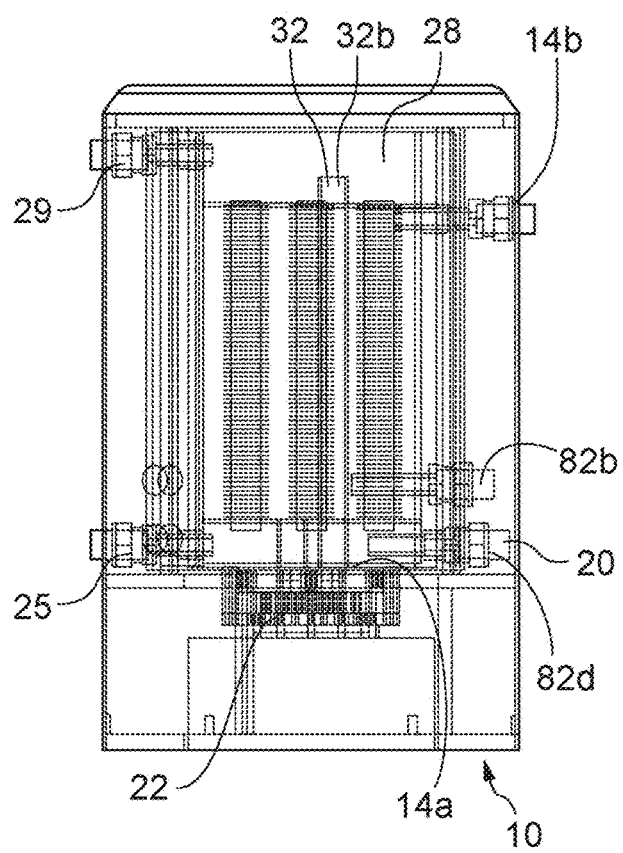
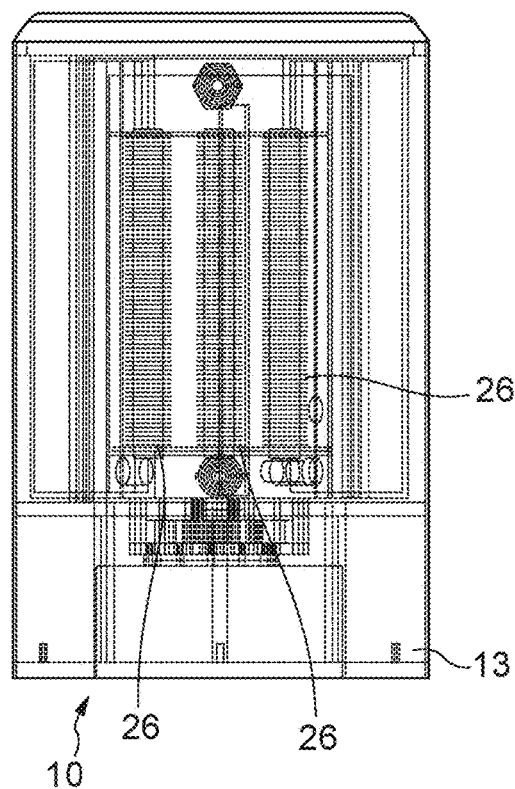
Fig. 2   Fig. 3
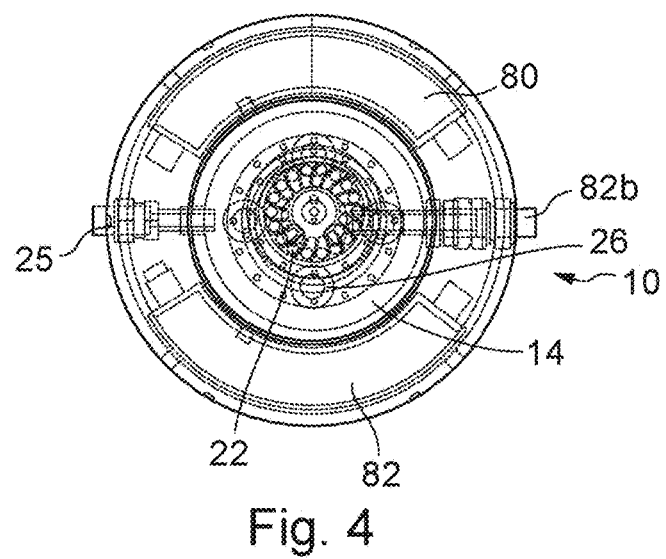
Fig. 4

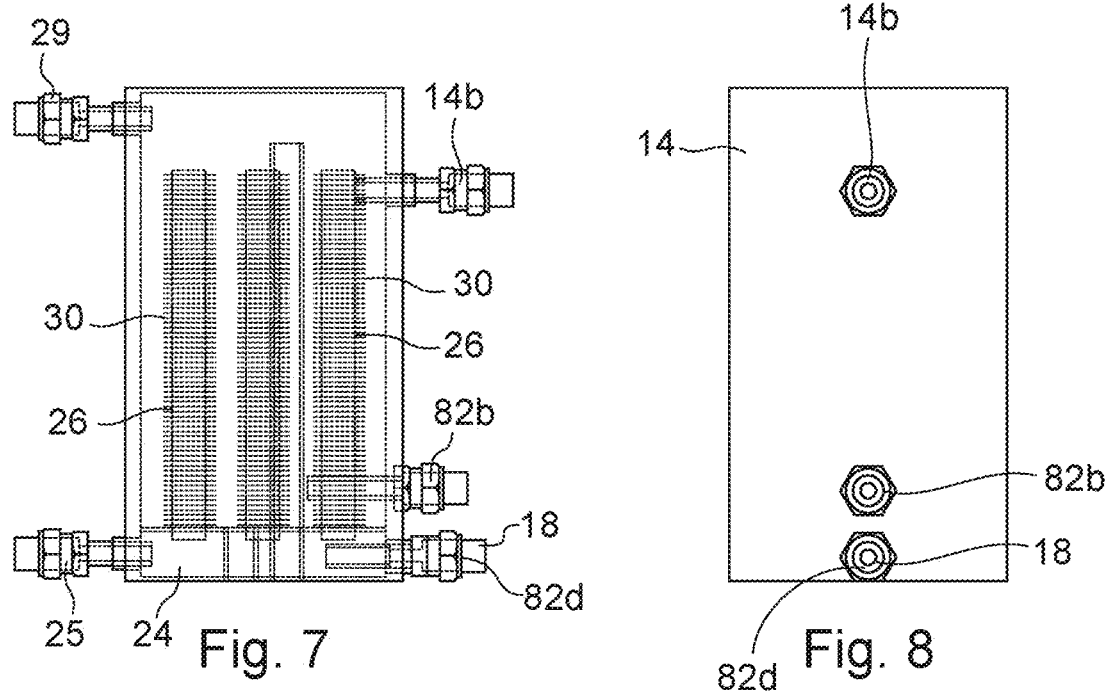
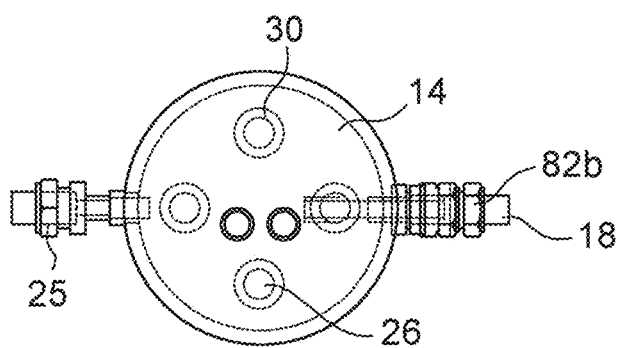
Fig. 7
Fig. 8
Fig. 9

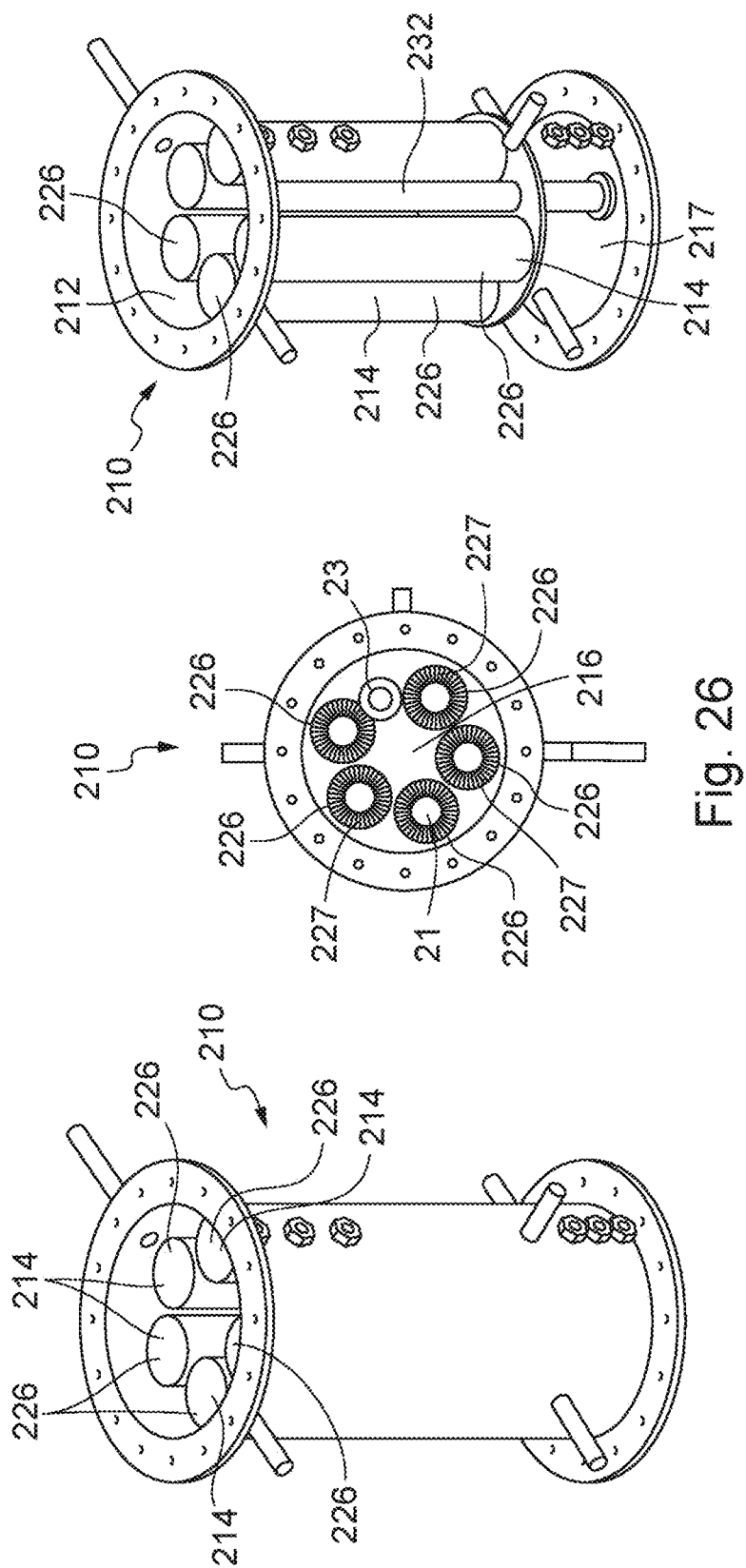

Section D-D

Section A-A

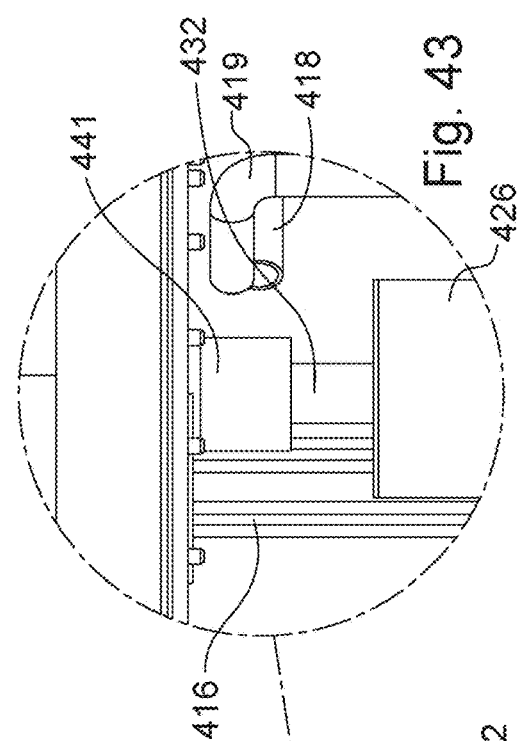
Fig. 43
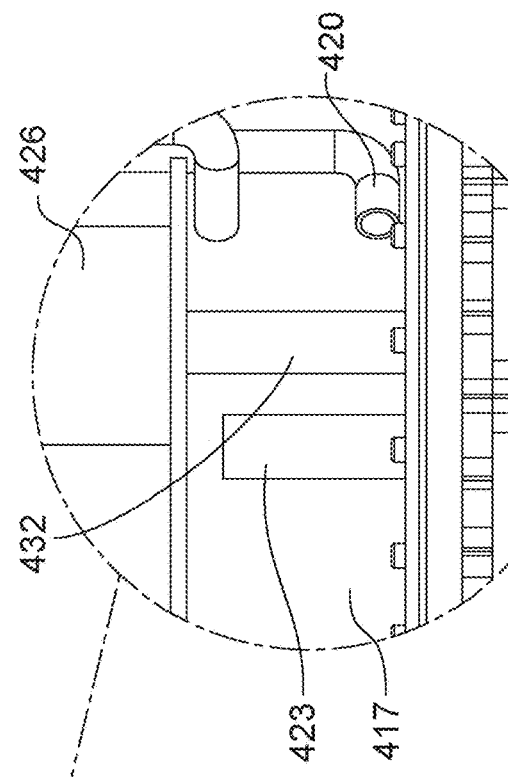
Fig. 44
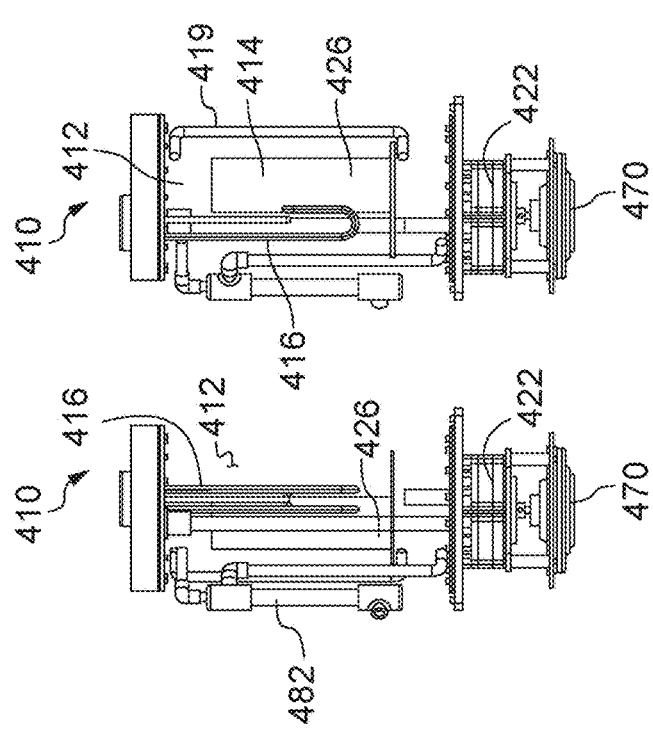
Fig. 42
Fig. 41
Fig. 40

DISTILLATION APPARATUS

CROSS-REFERENCE TO RELATED APPLICATIONS

This application is a national phase under 35 U.S.C. § 371 of PCT International Application No. PCT/EP2021/057857 which has an International filing date of Mar. 25, 2021, which claims priority to Great Britain Application No. 2004347.7, filed Mar. 25, 2020, the entire contents of each of which are hereby incorporated by reference.

FIELD OF THE INVENTION

The present invention relates to a distillation apparatus, especially such apparatus that may be deployed within a commercial, domestic or near-domestic situation to provide distilled water on demand.

BACKGROUND TO THE INVENTION

Pressures on fresh water supplies have become and continue to be greater as the world's population increases and requires more to survive.

Increasingly more use will have to be made of less directly potable sources of water, such as that which may be contaminated, brackish or otherwise deemed of previously marginal value. Moreover, quality in domestic mains supplies may deteriorate because of such factors as drought, contamination (such as by plastics and micro-plastics as these contaminate the water supply) ageing infrastructure and inability to cope with future demand.

Distillation provides one solution to this problem, but previous distillation plants tended to be energy hungry, large, unwieldy, uneconomical and suitable only for large scale supplies, such as for a town.

It would be useful to provide such apparatus for more individual or localised use, such as within a kitchen or a communal water source and servicing potentially a smaller number of people and suitable for use with smaller and more marginal supplies.

Such water may be necessary for hospital supplies, drinking water, clinics, laboratories, remote dwellings and villages; in short, anywhere it may be advantageous to improve the quality of the water available.

Furthermore, the apparatus may be of use in applications where distillation may be necessary to create or improve a product, such as small-scale alcoholic beverage production or soft drink dispensing.

SUMMARY OF THE INVENTION

According to a first aspect of the present invention there is provided a distillation apparatus comprising one or more evaporation chambers, one or more condensation chambers, a heat source, the heat source being arranged to supply heat to at least part of the evaporation chamber, a fluid inlet, a fluid outlet, and a vapour compression pump, wherein one or more of the condensation chamber or evaporation chambers surrounds at least part of the other of the one or more evaporation chamber or condensation chambers.

The one or more of the evaporation chambers may be wholly or partially located within the one or more condensation chambers or the one or more condensation chambers may be wholly or partially located within the one or more evaporation chambers.

The arrangement of one within the other allows for heat transfer to take place between an evaporating inlet fluid and a condensing outlet (distilled) fluid. This may increase efficiency off the overall system.

The evaporation chamber may comprise a cylindrical chamber.

The evaporation chamber may include an inlet sump.

The evaporation chamber may include one or more transit pipes.

The evaporation chamber may include a vapour chamber.

The heat source may surround the inlet sump.

The heat source may be provided within the evaporation chamber.

The fluid inlet may be positioned beneath the condensation chamber.

The fluid inlet may be positioned above the condensation chamber.

The one or more transit pipes may be provided with heat transfer fins.

The heat transfer fins may be circular discs which project radially from the pipes.

The one or more transit pipes may be located within the condensation chamber.

The one or more condensation chambers may be provided with an increased internal surface.

By "increased internal surface" it will be understood that the internal surface area of the condensation chamber(s) is greater than would be the case were the condensation chamber(s) uniform internally.

The condensation chamber(s) may be provided with internal heat transfer corrugation.

The corrugation may provide an increase in the surface area of the internal surface of the condensation chamber(s).

The increased surface area may also be provided by internal fins or other such geometries in order to achieve the increased surface area.

The placement of the transit pipes within the condensation chamber may allow additional heat transfer to take place between a fluid contained within the evaporation chamber and a fluid within the transit pipes.

The vapour chamber may be provided above the condensation chamber.

There may be provided a vapour conduit which connects the vapour chamber to the vapour compression pump.

The vapour compression pump may be a liquid ring pump.

The vapour compression pump may be a lubricating gerotor pump.

The vapour compression pump may be a progressive cavity pump.

The vapour compression pump may include a rotor rotating on an axis, that axis being vertical when the invention is properly orientated and functioning.

The vapour compression pump may be located below the evaporation chamber.

The liquid ring pump may comprise a pump body, a pump compression chamber provided within the pump body, a rotor mounted within the compression chamber, a rotor axle to mount said rotor, the rotor being provided with one or more ceramic bearings to mount it to the rotor axle.

There may be provided a port and line connecting the ceramic bearing(s) to a reservoir of distilled liquid. Thus, a small amount of distilled liquid may be transferred to the ceramic bearing(s) to enable lubrication.

The rotor may include one or more magnets.

There may be a plurality of magnets surrounding the rotor axle embedded within the body of the rotor.

The magnets may be used to spin the rotor and may also create tension in a bearing to mitigate backlash.

The pump may provide the rotor element.

There may be provided an electric motor to power the liquid ring pump. Other suitable rotational motion sources may be used such as mechanical power, internal combustion engine, gas turbine, wind turbine, hydro-power, steam engine, Stirling engine, etc.

There may be provided a magnetic transmission element coupled to the electric motor.

The magnetic transmission element may comprise a motor ring with one or more magnets provided around the motor ring.

The magnetic transmission element(s) attract the magnet(s) within the rotor, causing the latter to rotate. This enables the rotor element to be completely sealed within the pump body.

It will be appreciated by the skilled addressee that the magnet pairs in the transmission/rotor may be replaced with a pair of magnets/ferromagnetic material.

The fluid inlet and fluid outlet may be fed into a pre-distillation heat exchanger.

This may allow some heat from the fluid which has been distilled to be transferred to the fluid entering the apparatus.

The pre-distillation heat exchanger may be located adjacent the condensation chamber.

The apparatus may include an expansion tank.

The expansion tank may be located adjacent the condensation chamber.

By "fluid" this will be understood to encompass liquid, gas, vapour and mixtures of the three states.

The apparatus may be provided with a dosing pump.

The dosing pump may comprise two generally hemispherical body parts defining two interior chambers separated by a flexible membrane.

The apparatus may include a bypass valve connecting part of the one or more condensation chamber(s) to part of the one or more evaporation chamber(s).

BRIEF DESCRIPTION OF THE DRAWINGS

Embodiments of the invention will now be described, by way of example only, with reference to the following drawings, in which:

FIG. 2 is an end transparent elevation of the distillation apparatus of FIG. 1;

FIG. 3 is a side transparent elevation of the distillation apparatus of FIG. 1;

FIG. 4 is a plan transparent view of the distillation apparatus of FIG. 1;

FIG. 7 is a side transparent elevation of a chamber assembly of FIG. 1;

FIG. 8 is an end elevation of the chamber assembly of FIG. 5;

FIG. 9 is a plan transparent view of the chamber assembly of FIG. 1;

FIG. 25 is a perspective view of the condenser/evaporator assembly of the apparatus of FIG. 23;

FIG. 26 is a plan view of the condenser/evaporator assembly of the apparatus of FIG. 23;

FIG. 27 is a further perspective view of the condenser/evaporator assembly of the apparatus of FIG. 23;

FIG. 40 is a side elevation of a third embodiment apparatus according to the present invention;

FIG. 41 is an end elevation of the apparatus of FIG. 40;

FIG. 42 is a further side elevation of the apparatus of FIG. 40;

FIG. 43 is a detail view of the apparatus of FIG. 40;

FIG. 44 is a further detail view of the apparatus of FIG. 40;

Figure 1:
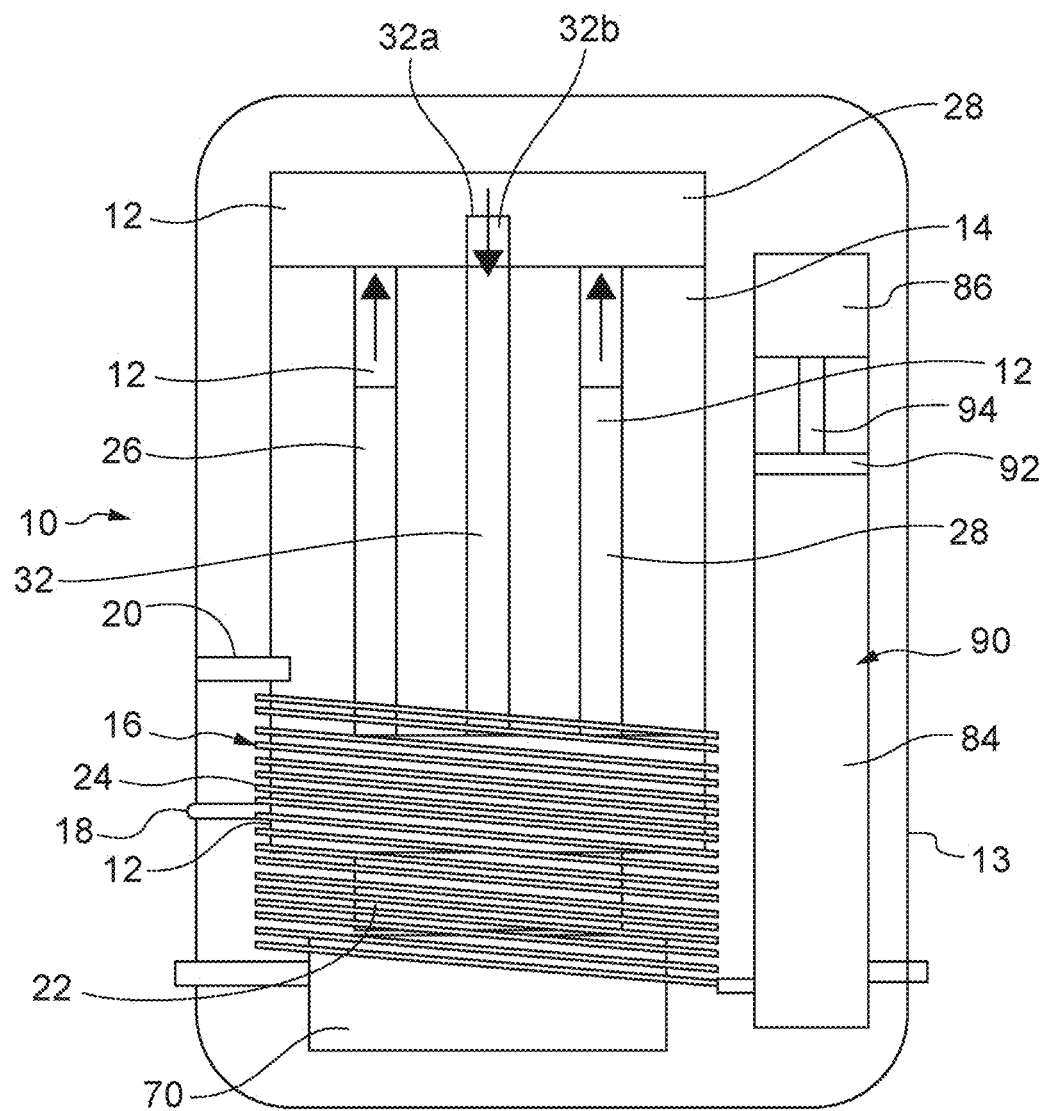
FIG. 1 is a side schematic view of a first embodiment distillation apparatus according to a first aspect of the present invention.
Figures 5, 6:
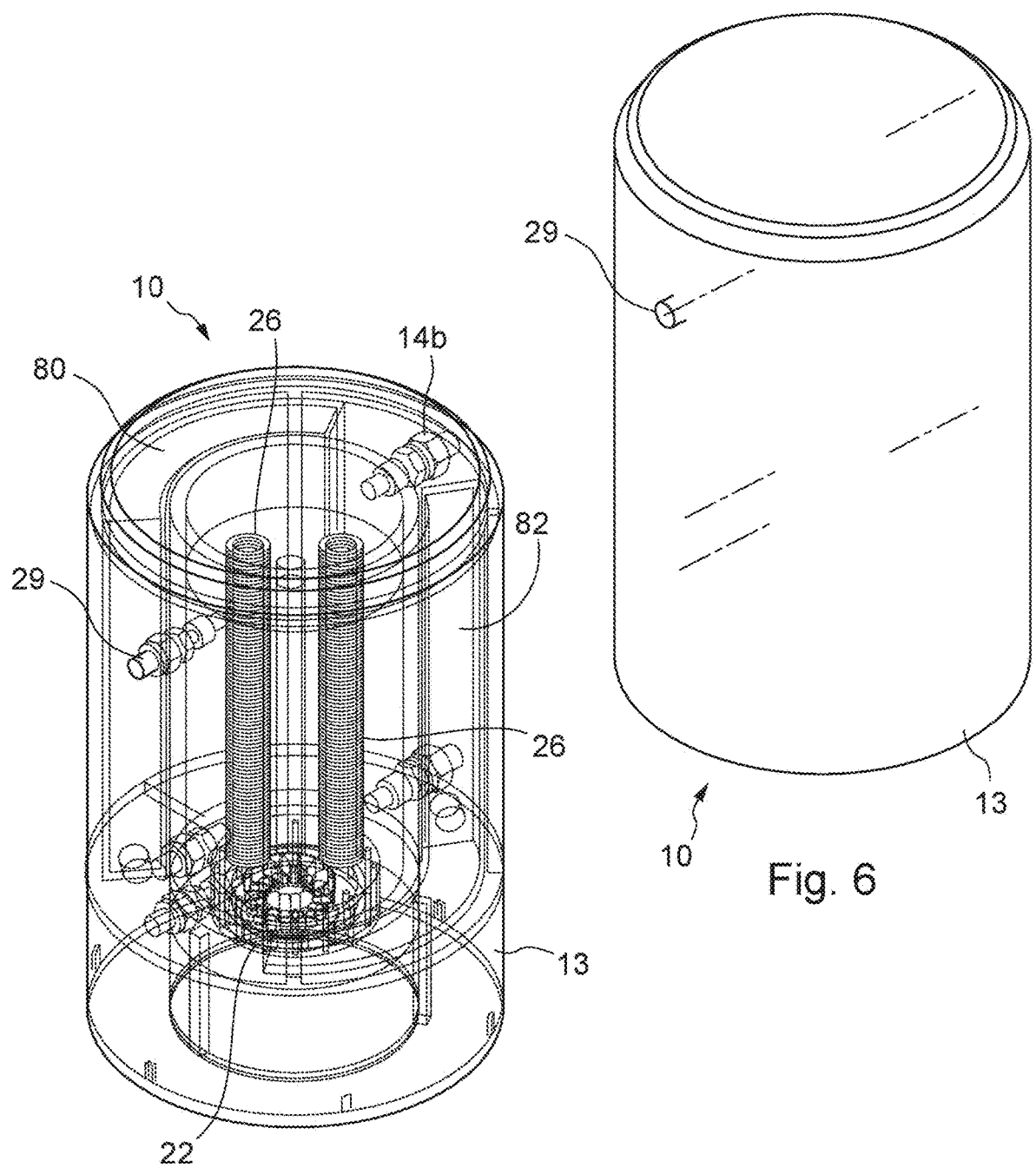
FIG. 5 is a perspective transparent view of the distillation apparatus of FIG. 1.
FIG. 6 is a perspective view of the distillation apparatus of FIG. 1.
Figure 13:
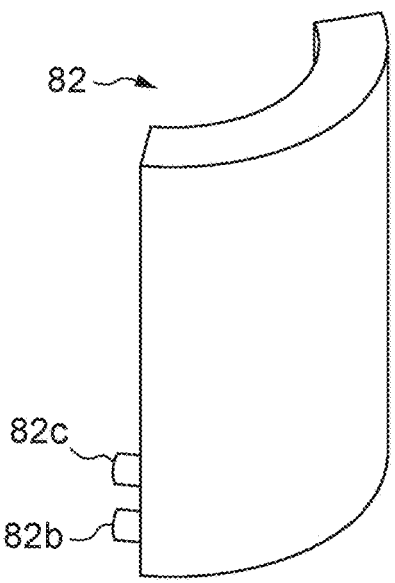
FIG. 13 is a perspective view of the heat exchanger of FIG. 10.
Figure 10:
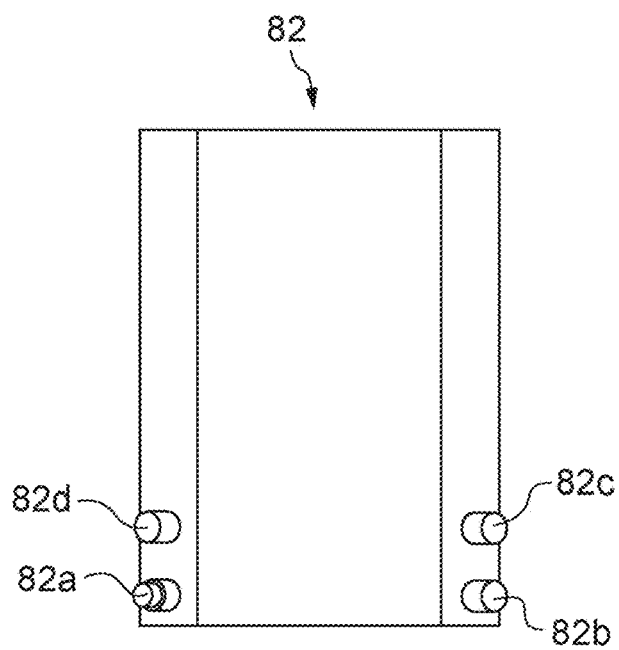
FIG. 10 is as end elevation of a heat exchanger of the distillation apparatus of FIG. 1.
Figure 12:
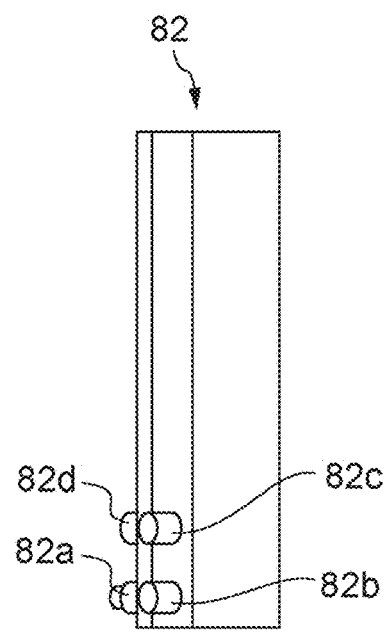
FIG. 12 is a side elevation of the heat exchanger of FIG. 10.
Figure 11:
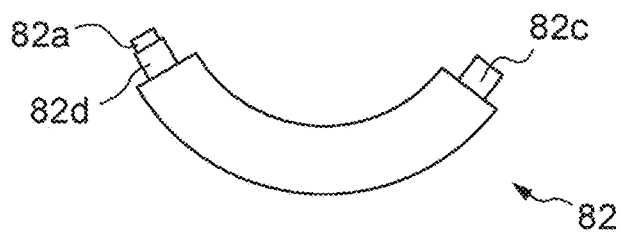
FIG. 11 is a plan view of the heat exchanger of FIG. 10.
Figure 14:
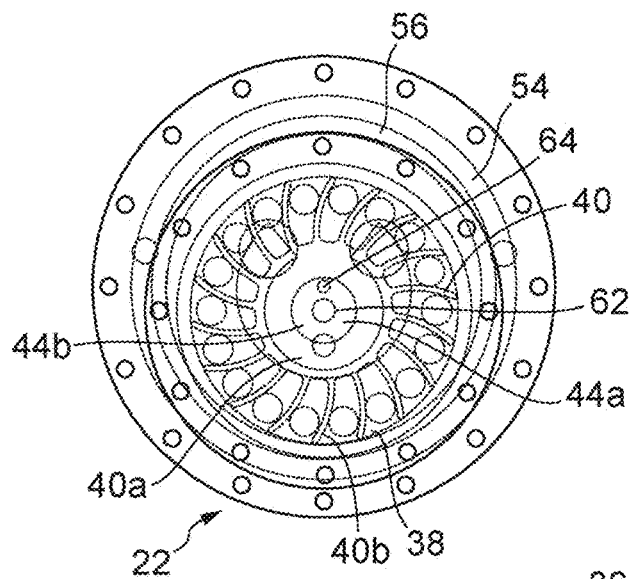
FIG. 14 is a plan transparent view of the liquid ring pump of the apparatus of FIG. 1.
Figure 15:
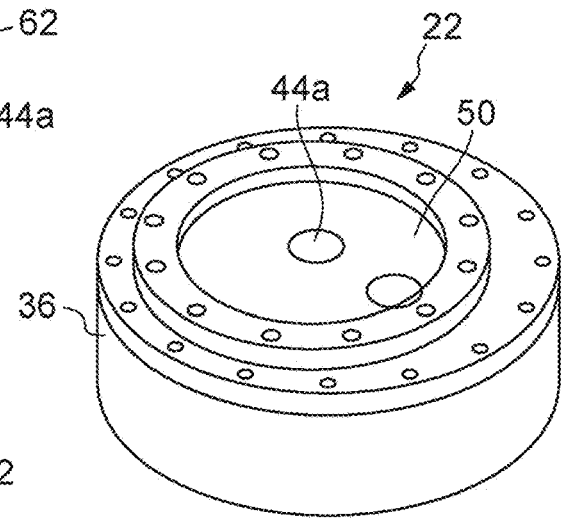
FIG. 15 is a perspective view of the liquid ring pump of FIG. 14.
Figure 16:
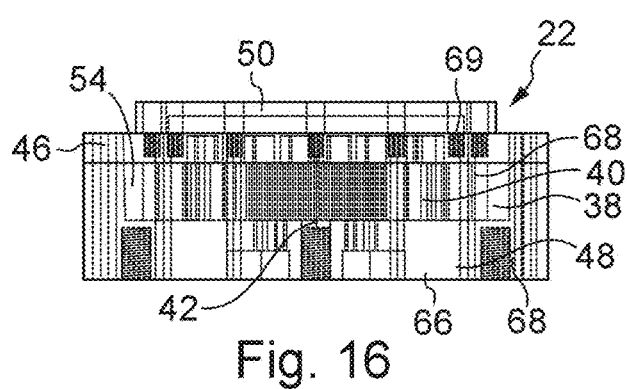
FIG. 16 is a side transparent elevation of the liquid ring pump of the apparatus of FIG. 1.
Figure 17:
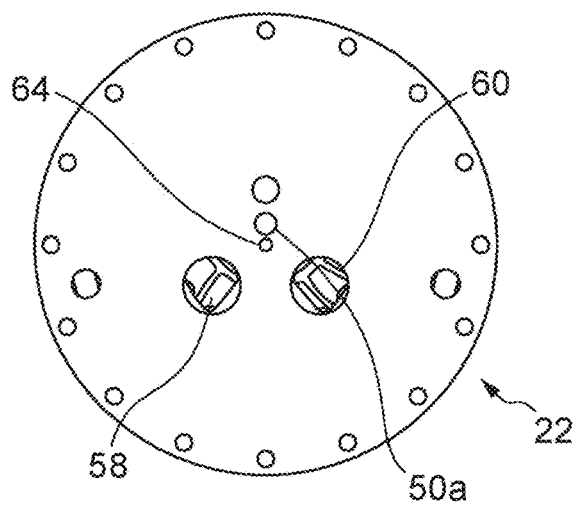
FIG. 17 is a plan view of the liquid ring pump of the apparatus of FIG. 1.
Figure 18:
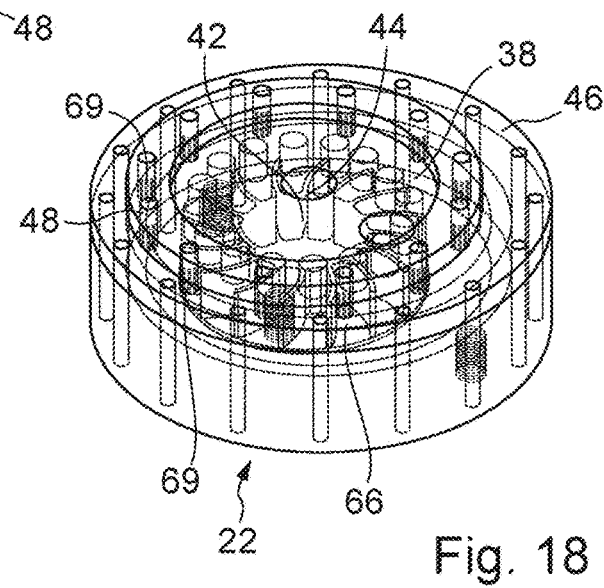
FIG. 18 is a transparent perspective view of the liquid ring pump of FIG. 14.

Referring to the drawings and initially to FIG. 1, a first embodiment distillation apparatus 10 is depicted.

Distillation apparatus 10 comprising an evaporation chamber 12, a condensation chamber 14, a heat source 16, the heat source 16 being arranged to supply heat to at least part of the evaporation chamber 12, a fluid inlet 18, a fluid outlet 20, and a vapour compression pump 22, wherein the condensation chamber 14 surrounds at least part of the evaporation chamber 12. A cylindrical outer housing 13 houses the various components.

The heat source 16 is an electric coil heater 16, but the skilled addressee will realise that any suitable heat source may be used. For example, a cartridge heater or band heater may be used. The former may be advantageous in its ability to be easily installed, replaced and serviced within the apparatus 10, and the latter may be advantageous in that it may mitigate contamination on a heating element positioned within the sump 24.

The evaporation chamber 12 comprises an inlet sump 24, one or more transit pipes 26 and a vapour chamber 28. The electric coil heater 16 surrounds the sump 24 and applies heat primarily to the sump 24. The sump 24 is a squat cylindrical shape i.e. its diameter exceeds its height.

The sump 24 is located directly beneath the condensation chamber 14. The condensation chamber 14 is a taller cylinder with approximately the same diameter as the sump 24, but several times its height.

A valved drain 25 is provided at the base of the sump 24.

A condensation chamber inlet 14a is provided in the base of the condensation chamber 14. A condensation chamber overflow valve 14b is provided on the sidewall of the condensation chamber 14, adjacent the uppermost portion of the condensation chamber 14b.

The transit pipes 26 project from the upper surface of the sump 24 and allow fluid to enter from the sump 24. The transit pipes 26 extend vertically through the condensation chamber 14. There are four transit pipes 26 in the present embodiment, but this number may be varied in alternative embodiments. The four transit pipes 26 are spaced equally around the condensation chamber 14.

Transfer fins 30 surround the transit pipes 26. The transfer fins 30 are circular disks which surround and extend radially from the transit pipes 26. The transfer fins 30 are intended to improve heat transfer to the transit pipes 26 from their surroundings i.e. the condensation chamber 14.

The placement of the transit pipes 26 within the condensation chamber 14 may allow additional heat transfer to take place between a fluid contained within the condensation chamber 14 and a fluid within the transit pipes 26.

The vapour chamber 28 is provided above the condensation chamber 14. The vapour chamber 28 is a similar squat cylinder to the sump 24. A vent valve 29 is provided which connects the vapour chamber 28 to the outside of the apparatus 10. This may be to the atmosphere or to a safety cowling, and the vent valve 29 may be pre-set to vent vapour at a particular pressure, or may allow manual venting of the system.

A vapour conduit 32 connects the vapour chamber 28 to a vapour compression pump 22. The entrance 32a of the vapour conduit 32 contained within the vapour chamber 28 has a raised lip 32b such that fluid which may condense into a liquid in the vapour chamber 28 and collect on the lower surface of the vapour chamber 28 is prevented from dripping into the vapour conduit 32 such that potential damage of the vapour compression pump 22 is mitigated. Moreover, a gas non-return valve (not shown) may be fitted onto the vapour conduit 32 at the entrance 32a. This may help regulate the pressure within the condensation chamber 14 and evaporation chamber 12.

The various components may be constructed from a suitable stainless steel which is preferably a 300 Series stainless steel, such as a food-grade 304 or medical grade 316.

The vapour compression pump 22 is a liquid ring pump 22. The liquid ring pump 22 comprises a pump body 36, a pump compression chamber 38 provided within the pump body 36, a rotor 40 mounted within the compression chamber 38 and a rotor axle 42 to mount the rotor 40. One or more ceramic bearings 44 are used to mount the rotor 40 to the rotor axle 42. In the present embodiment there are two ceramic bearings 44a, 44b, and these are a standard ball-bearing type two-way bearing.

Although not specifically a thrust bearing, the bearings 44a, 44b provide a degree of resistance to any longitudinal displacement of the rotor 40 along the axle 42 and thrust bearings may be substituted. The axle 42 is fixed (i.e. does not rotate), but in the alternative, an axle may be mounted upon bearings with the rotor fixed to the axle, such that it would be the axle and rotor assembly that would rotate in unison, rather than the rotor about the axle.

The pump body 36 comprises a first body part 46, an intermediate body part 48, a sealing lid 50 and a retaining compression ring 52.

The first body part 46 is a generally flat cylinder (whose length to diameter ratio is in the approximate range of 1:2 to 1:4). The lowermost half of the length of the cylinder (from the perspective of the Figs) includes part of the compression chamber 38 within which the rotor 40 is seated.

A liquid cooling jacket 54 comprising a rectangular toroidal depression surrounds the compression chamber 38 separated by a jacket sidewall 56. Inlet liquid (i.e. the liquid, such as contaminated water, being distilled by the apparatus 10) is channelled around this liquid cooling jacket 54 to provide coolant to the fluids within the compression chamber 38.

Input port 58 and output port 60 are provided through the first body part 46 which provide fluid communication ports into and out of the compression chamber 38. As can be seen from the Figs, these communicate from the uppermost edge of the first body part 46. The output port 60 is connected to the condensation chamber inlet 14a.

An axle receiving bore 62 is located at the centre of the first body part 46, and a lubricating port 64 is provided therein. The lubricating port 64 may allow lubricant (which may be the fluid being distilled e.g. water) to run down the axle and lubricate uppermost bearing 44a. Water, for example, may provide ample lubrication for the ceramic bearings of the type employed.

A magnet boss 66 is provided at the base of the rotor. In the present embodiment, it accounts for approximately 30% of the thickness of the rotor (measured along the X-X axis) and provides a close but sliding fit with an interior bore 68 provided on the intermediate body part 48.

The bore 68 provides part of the compression chamber 38. A plurality of rotor magnets 69 are provided around the circumferential edge of the magnet boss 66. There are twelve rotor magnets 69 equally spaced around the magnet boss 66. They are orientated with alternating poles i.e. N-S, S-N, N-S, etc. They are cobalt-samarium high temperature magnets in the present embodiment, which offers a strong magnetic attraction and is chemically stable so would not contaminate the liquid being distilled. Other magnets may be used, for example Samarium-cobalt, GBD Neo or neodymium-iron-boron, which offer both high temperature and chemical stability.

Rotor 40 is of a typical shape of a liquid ring pump 22, comprising a central boss 40a from which extend a plurality of curved vanes 40b. The rotor 40 is generally circular and rotating within the offset confines of the compression chamber 38 tends to cause a compression towards one side and a vacuum towards the other; this follows the general flow from input to output port.

The magnet boss 66 provides a close but sliding fit with an interior bore 68 provided on the intermediate body part 48. The magnet boss 66, central boss 40a and curved vanes 40b form one piece in the present embodiment, which may be a machined, cast or printed part.

The bore 68 provides part of the compression chamber 38. The compression chamber 38 has a substantially oval or obround cross-section as will be apparent from the Figs.

The vapour conduit 32 connects the input port 58 to the vapour chamber 28 (and therefore the uppermost part of the evaporation chamber 12) to the liquid ring pump 22. Operation of the liquid ring pump 22 creates a vacuum on the inlet side, drawing vapour within the vapour chamber 28 into the liquid ring pump 22, and compressing it towards the outlet port 60, which in turn is connected to the condenser inlet.

The body is sealed by the lid 50. An axle receiving aperture 50a is provided on the lid to mount the axle.

An electric motor 70 is provided which connects to the rotor 40 via a transmission element 72. The transmission element 72 is a magnetic transmission element 72 and comprises a magnet disk mount 74. A plurality of magnets 76 are provided around the outer circumferential edge of the magnet disk mount 74. There are twelve rotor magnets 76 equally spaced around the magnet disk mount 74. They are orientated with alternating poles i.e. N-S, S-N, N-S, etc. They are samarium high temperature magnets in the present embodiment.

As the electric motor 70 rotates the transmission element 72, the magnets 76 rotate around the X-X axis, and the attraction to the corresponding rotor magnets causes the rotor 40 to rotate, thereby drawing vapour into the liquid ring pump 22.

It will be noted that gravity (as will subsequently be described) plays a significant role in the functioning of the apparatus 10, such that the orientations shown in the Figs conforms to that of a preferred real-life installation (gravity applying in a vector from the top of the page towards the bottom).

An expansion tank 80 and pre-distillation heat exchanger 82 are provided within the cylindrical body 13 and which surround the condensation chamber 14. Both the expansion tank 80 and pre-distillation heat exchanger 82 share a similar external form, being a substantially C-shaped prism, which allow them to surround the cylindrical condensation chamber 14 with minimal wasted space.

The expansion tank 80 is a typical membrane type tank that enables distilled fluid to be held at pressure until required. Distilled fluid collects in the expansion tank 80 via a fluid inlet 80a and may be drawn from the tank 80 from a fluid outlet 80b.

The pre-distillation heat exchanger 82 has a pre-distilled fluid inlet 82a, a pre-distilled fluid outlet 82b, a distilled fluid inlet 82c and a distilled fluid outlet 82d. The interior of the heat exchanger 82 houses a pre-distilled fluid conduit (not shown) and a distilled fluid conduit (not shown). The two fluid conduits are arranged such that they maintain contact over a significant portion of their lengths to enable heat transfer to take place. In the usual scenario, the pre-distilled fluid may enter the apparatus around the usual outside or room temperature range i.e. between 1° and 25° Celsius. The distilled fluid having condensed into a liquid and under pressure may have a temperature around (or even exceeding) 100° Celsius. This serves a dual function of both pre-heating the inlet fluid to reduce energy consumption to evaporate the fluid, but also by slightly cooling the distilled outlet fluid.

The fluid inlet 18 of the apparatus 10 attaches to the pre-distilled fluid inlet 82a in the present embodiment. This may be supplied by, for example, mains water under around 1 bar of pressure and the fluid inlet 18 may be supplied with a valve (not shown) simply to control the flow of water. Alternatively, the fluid to be distilled may be supplied from another source and a pump (not shown) may be provided to pressurise the fluid prior to entry into the apparatus 10.

The heat exchanger 82 connects to the condensation chamber 14 via the distilled fluid inlet 82c. The expansion tank 80 is connected to the heat exchanger 82 via the fluid inlet 80a which connects to the distilled fluid outlet 82d and onto the fluid outlet 20 of the apparatus 10.

The heat exchanger 82 is also connected to the sump 24 via the pre-distilled fluid outlet 82b.

A pneumatic actuator 84 may be provided on the apparatus 10. The pneumatic actuator 84 is supplied to regulate the fluid supply pressure of the apparatus 10. The pneumatic actuator 84 may be supplied as an alternative to the expansion tank 80 or in addition to it, and its primary purpose is to regulate the supply pressure of the distilled fluid leaving the apparatus 10.

The pneumatic actuator 84 comprises an upper pneumatic actuator portion 86, a cylindrical outer body 88, containing an internal cavity 90, a piston 92 and a connecting rod 94 which connects the actuator portion to the piston 92.

The distilled liquid outlet of the apparatus 10 is connected to the internal cavity 90 and distilled liquid fills this against the piston 92.

The upper pneumatic actuator portion 86 comprises a pneumatic cylinder 96 and piston 98 arrangement with the pneumatic piston 96 being connected to the distal end of the connecting rod 94. The cylinder 96 and piston 98 define two separate pneumatic chambers 96a, 96b, a first pneumatic chamber 96a being on the distal side of the connecting rod 94 and a second pneumatic chamber 96b. First and second compressed air two-way valves 96c, 96d allow compressed air to be supplied to the first pneumatic chamber 96a or second pneumatic chamber 96b, thereby moving the connecting rod 94 to influence the level of the liquid held within the internal cavity 90. This can therefore regulate the pressure of the distilled liquid exiting the system.

The evaporation chamber 12 is intended to operate in the 1-2 bar range, preferably around 1.4 bar. A safety valve 99 is provided on the evaporation chamber set to vent at between 2-3 bar pressure. The internal operating temperature of the evaporation chamber is intended to be around the 125-140 degrees Celsius range.

The starting operation for the apparatus 10 is to open the valve on the fluid inlet 18 and fill the sump 24 to a defined level (80-90% of full). The heat source 16 is activated to allow the fluid in the sump 24 to reach 100-102 C, thereby causing water vapour/steam to accumulate in the upper part of the sump 24 and begin to rise through the transit pipes 26.

The pump 22 is activated and creates a vacuum pressure at the base 32b of the vapour conduit 32. This draws vapour up the transit pipes 26, into the vapour chamber 28 and into the vapour conduit 32.

The liquid ring pump 22 compresses the vapour and transports it into the condensation chamber 14, where the fluid condenses into a liquid on the lower surface of the condensation chamber 14.

The liquid ring pump 22 also increases the temperature of the vapour/steam, entering at around 100° C. and exiting around 130° C. This provides heat to the fins 30 and therefore into the vapour within the transit pipes 28 and, potentially, the heat exchanger 82, further boosting efficiency.

The material of the various components of the pump 22 will be non-reactive with the liquid being distilled. In the current embodiment which envisages a water distillation process, the rotor and body components may be an inert material, and in this case materials such as food grade plastics, stainless steels, or anything with contamination rates falling within acceptable parameters are possible.

The liquid having pooled within the condensation chamber 14 is drawn through the heat exchanger via the distilled fluid inlet 82c and passing through the internal distilled fluid conduit (not shown). This transfers heat to the incoming pre-distilled fluid as it travels along the internal pre-distilled fluid conduit on its way towards the sump 24. The expansion tank 80 is connected to the heat exchanger 82 via the fluid inlet 80a which connects to the distilled fluid outlet 82d and thus the distilled liquid enters the expansion tank 80. Liquid may then be stored here until required, and it may be transported from the apparatus to further storage, refrigeration, be used etc.

The drain valve 25 on the sump 24 may be used to drain highly contaminated pre-distilled liquid that should pool at the base of the sump. This drain valve may also allow the sump 24 to be cleaned.

An external expansion tank 190 may be used with the distillation apparatus 10. This is a diaphragm-style expansion tank in the present embodiment and is used to compensate for pressure differences in the apparatus 10 (See FIGS. 19 and 22). This may be in addition or as an alternative to the on-board expansion tank 80.

The expansion tank 190 comprises a pressure vessel 191 with a lower liquid side 192 and an upper pressurised gas side 193. The upper pressurised gas side 193 has a set volume of gas and therefore a set pressure (assuming minor temperature effects). A diaphragm 194 separates the two areas and as the pressure of the liquid side varies, the position of the diaphragm 194 moves to allow for changes in the lower liquid side and to maintain a suitable back pressure on the apparatus 10.

Figure 19:
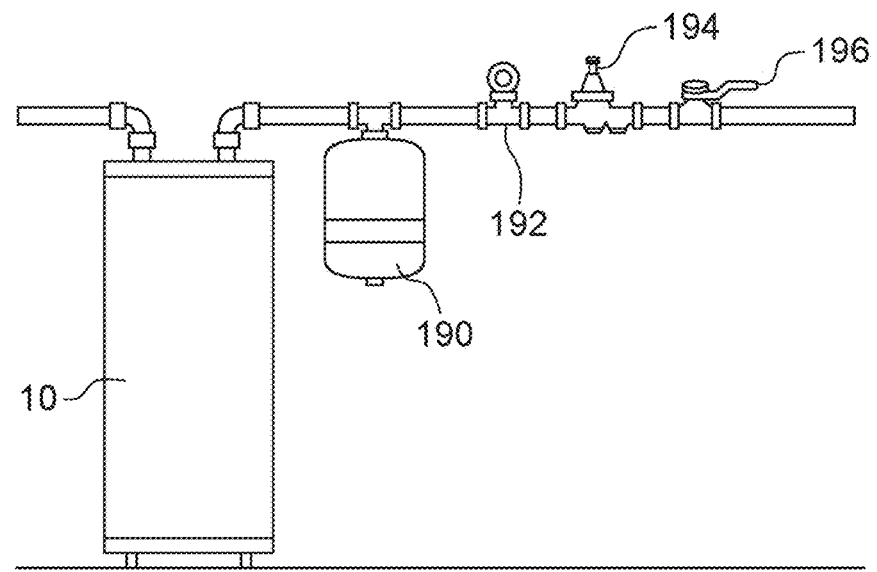
FIG. 19 is a schematic representation of the apparatus of FIG. 1 in an installed condition.
Figure 20:
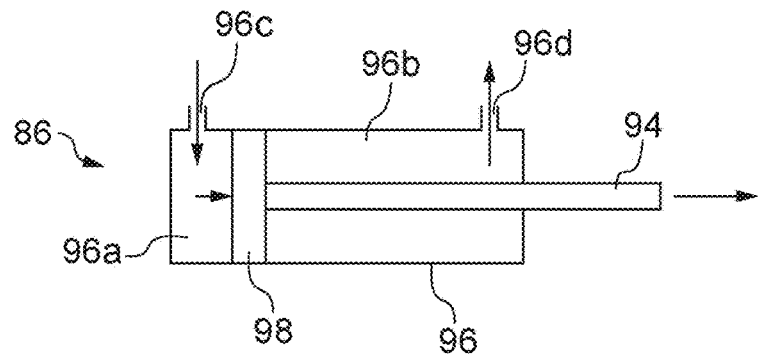
FIG. 20 is a schematic representation of a pneumatic actuator of the apparatus of FIG. 1.
Figure 21:
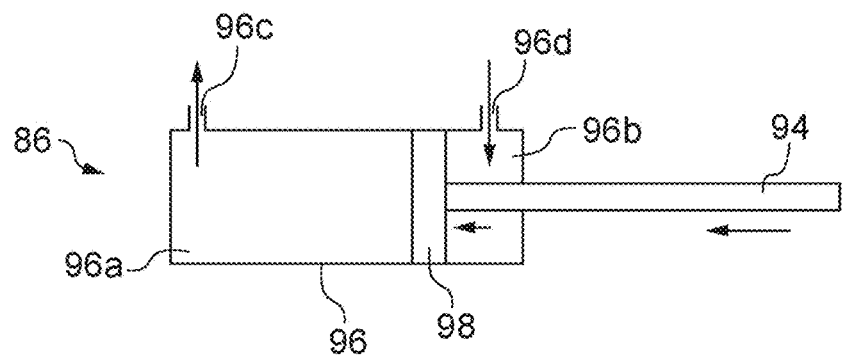
FIG. 21 is a further schematic representation of the pneumatic actuator of FIG. 1.
Figure 22:
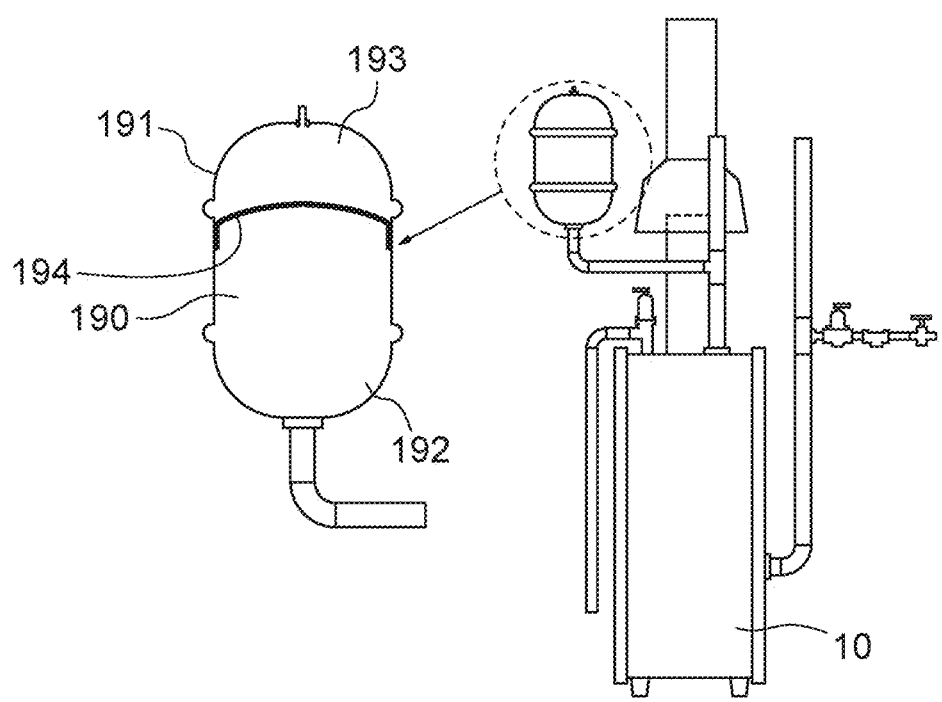
FIG. 22 is a schematic representation of a further installation of the apparatus of FIG. 1.
Figure 24:
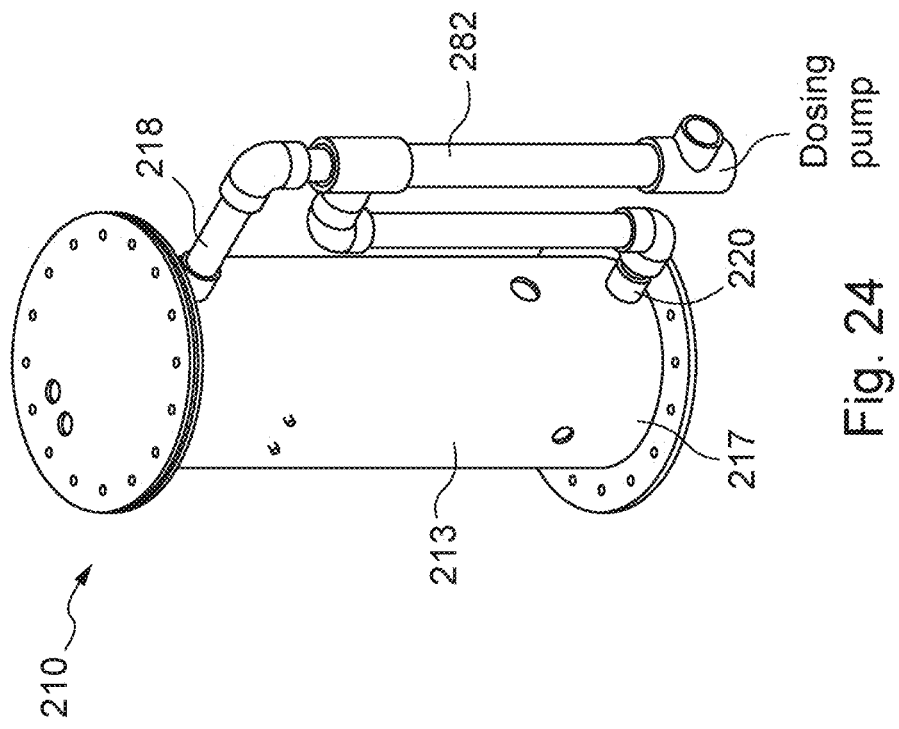
FIG. 24 is a perspective view of the distillation apparatus of FIG. 23.
Figure 23:
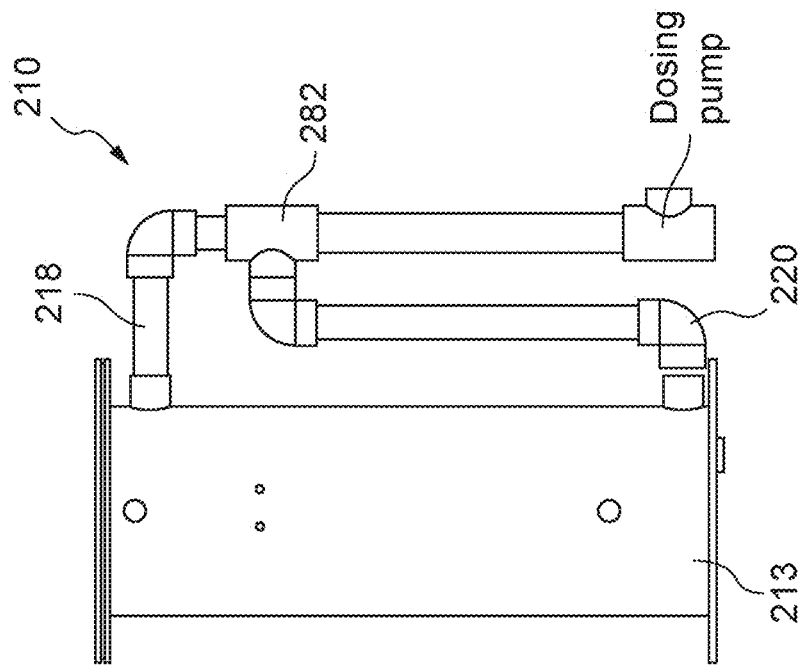
FIG. 23 is a side elevation of a second embodiment distillation apparatus according to the present invention.

A pressure gauge 192, pressure reducing valve with by-pass 194, and a shut-off valve 196 may be provided downstream of the external expansion tank 190 (see FIG. 19). This may serve as a cold-water supply. A potential set-up for a hot water supply is shown in FIG. 22.

It will be appreciated by the skilled addressee that the magnet pairs in the transmission/rotor may be replaced with a pair of magnets/ferromagnetic material.

Each of the described features of the described embodiments may be used to modify other described embodiments, or indeed may be replicated in a single embodiment without departing from the scope of the present invention.

Furthermore, in addition to the described priming measures and systems, each of the described embodiments may be provided with one or both of a vacuum pump and/or an external heating system, to enable the apparatus to move from an "off" state to a working state.

The vacuum pump 22, or indeed a further vacuum pump, may operate to reduce the overall working pressure of the system to below gauge pressure, thereby improving evaporation in the evaporation chamber.

Equally, the system may be pressurised above gauge pressure if this improves heat transfer rates and/or evacuation of distilled water from the system.

A second embodiment apparatus 210 is depicted in FIGS. 23 to 39. Similarly functioning parts of the second embodiment are numbered with a similar numbering scheme albeit prefixed with a "2". For example, vacuum pump 222 and motor 270. These will not be described further where they function as the integers described in the first embodiment but will be further elaborated below where there are differences.

The second embodiment distillation apparatus 210 comprises an evaporation chamber 212, a condensation chamber 214, a heat source 216, the heat source 216 being arranged to supply heat to at least part of the evaporation chamber 212, a fluid inlet 218, a fluid outlet 220, and a vapour compression pump 222, wherein the evaporation chamber 212 surrounds at least part of the condensation chamber 214. A cylindrical outer housing 213 houses the various components. The inlet sump of the second embodiment (and third - see below) is the lower portion of the evaporation chamber 212.

The condensation chamber 214 comprises five separate pipe condensation chambers 226 and a lower condensation chamber 217 provided in the distillation apparatus 210. In the present embodiment, the condensation chambers 226 are located within the evaporation chamber 212 and the lower condensation chamber 217 is adjacent the evaporation chamber 212 being directly below it separated by a circular plate 233. Again, heat transfer is possible between the inlet fluid in the evaporation chamber 212 and the fluid condensing in the condensation chambers 226.

Corrugated internal heat transfer surfaces 227 are provided within the five pipe condensation chambers 226. The corrugated heat transfer surfaces 227 increase the internal surface area of the pipe condensers 226 thereby improving heat transfer. These provide greater surface area over which the distilled vapour may condense.

The corrugated internal heat transfer surfaces 227 both undulate circumferentially around the inner surface of the pipe condensers 226 and have a slight wave shape longitudinally along the pipe condensers 226. This wave undulation shape further increases the effective surface area of the interior of the pipe condensers 226. The skilled addressee will appreciate that other internal configurations are possible to increase the internal surface area, such as louvred, honeycomb, ruffled, lanced offset fins, round or flat-crested, knurled etc.

The external surfaces of the pipe condenser 226 are smooth and may also be polished. It has been found that having a smooth, polished exterior surface mitigates the build-up of limescale and other potentially undesirable contaminants.

The five pipe condensers 226 are arranged around the interior of the condensation chamber 214. The vapour conduit 232 is located between two of the five pipe condensers 226, with all six pipes being arranged generally circularly around the circumference. The vapour conduit 232 is located slightly inboard but is not located centrally as in the first embodiment described above.

Figure 28:
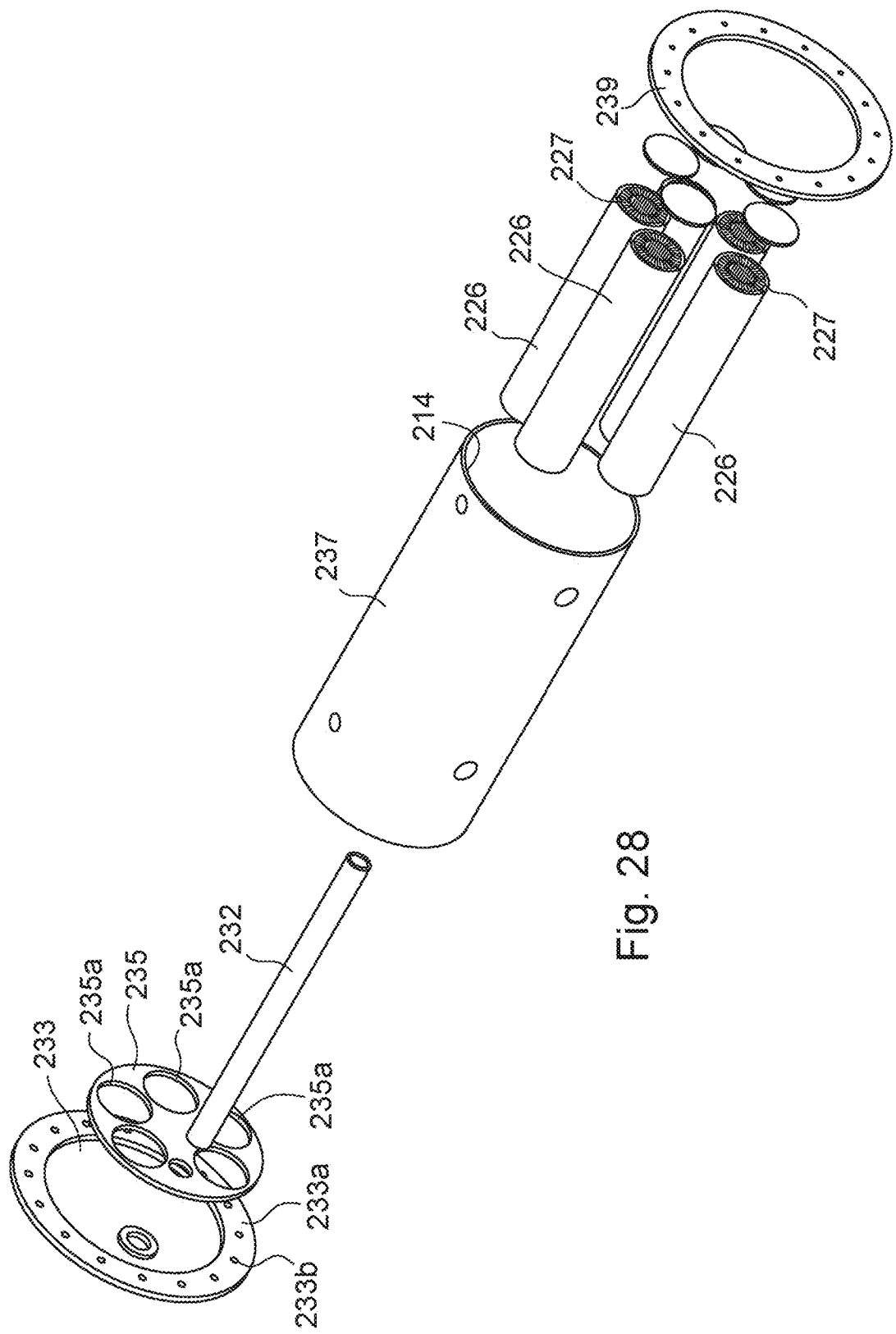
FIG. 28 is an exploded perspective view of the condenser/evaporator assembly of the apparatus of FIG. 23.

An exploded view of the main condenser/evaporator assembly is shown in FIG. 28. The condenser/evaporator assembly comprises a lower circular plate 233 having a surrounding flange portion 233a. A plurality of connection bores 233b are provided around the flange. portion 233a. A vapour conduit orifice 233c is provided offset from the centre and cooperates with the vapour conduit 232.

A circular mounting plate 235 sits atop the lower circular plate 233. Six orifices are provided in the circular mounting plate: five condenser pipe orifices 235a and one vapour conduit orifice 235b. These respectively receive and mount the pipe condensers 226 and the vapour conduit 232.

A cylindrical evaporation chamber sidewall 237 is mounted atop the lower circular plate 233 with the circular mounting plate 235 within the open lower end of the cylindrical evaporation chamber sidewall 237. The cylindrical evaporation chamber sidewall 237 is provided with various orifices for valves and pipes etc.

The cylindrical evaporation chamber sidewall 237 generally defines the evaporation chamber 212 and acts as a pressure vessel. The pipe condensers 226 and vapour conduit 232 sit within the cylindrical evaporation chamber sidewall 237.

An upper flange plate 239 is attached at the distal end of the cylindrical evaporation chamber sidewall 237 from the lower circular plate 233 and mounting plate 235.

A bypass valve (not shown) is provided which connects the tops of the evaporation chamber and the condensation chamber and is usually closed when the pump/system is running and generating pressure differential but can be opened electronically to equalise the pressures within both chambers to stop distillate flushing back when the pump stops. The bypass valve allows to equalise the pressure in the evaporation and condensation chambers much faster than by heat transfer and condensation thus reducing the safe stop time.

Because of the positive pressure differential between the condensation chamber and evaporator the steam can only flow one way. That helps to maintain the purity of the distillate when the valve is open.

Figure 29:
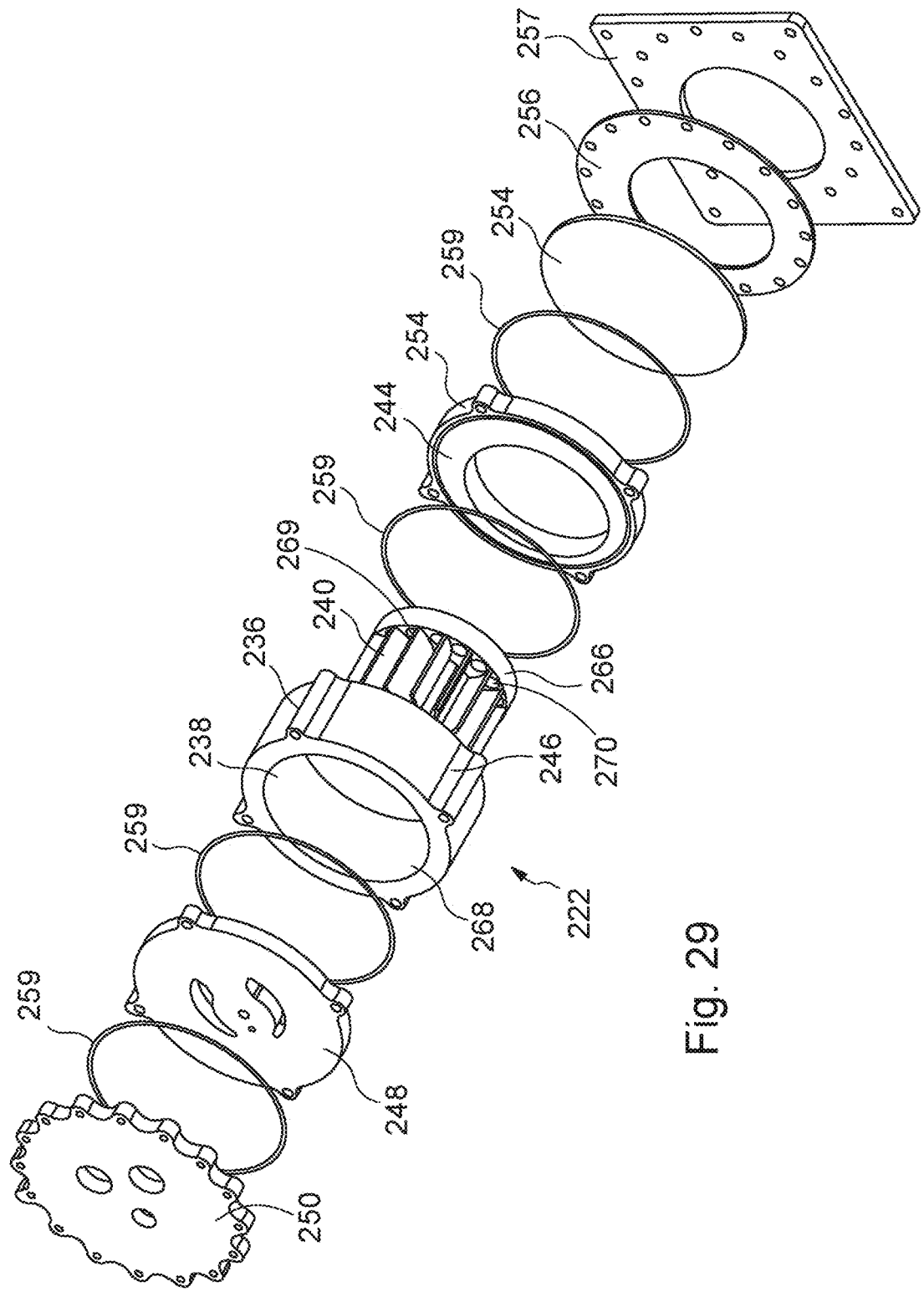
FIG. 29 is an exploded perspective view of the vapour compression pump of the apparatus of FIG. 23.
Figure 34:
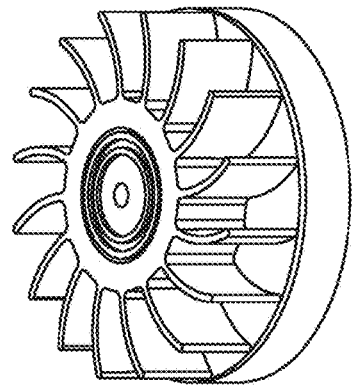
FIG. 34 is a perspective view of the rotor of FIG. 30.
Figure 35:
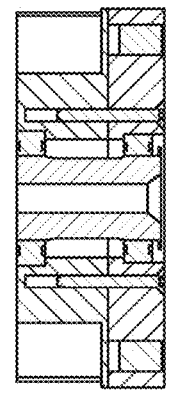
FIG. 35 is a section on D-D of the rotor of FIG. 31.
Figure 31:
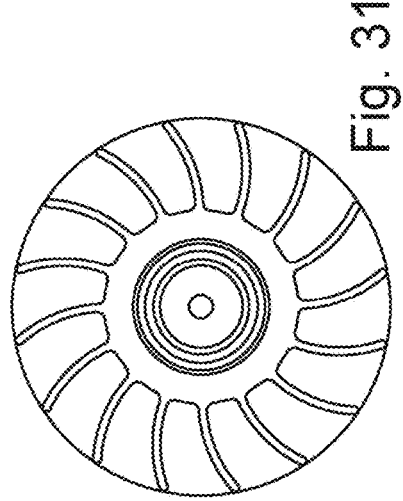
FIG. 31 is a plan view of the rotor of the pump of FIG. 28.
Figure 32:
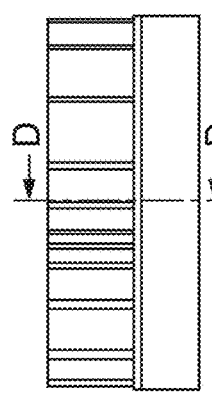
FIG. 32 is a side elevation of the rotor of FIG. 30.
Figure 33:
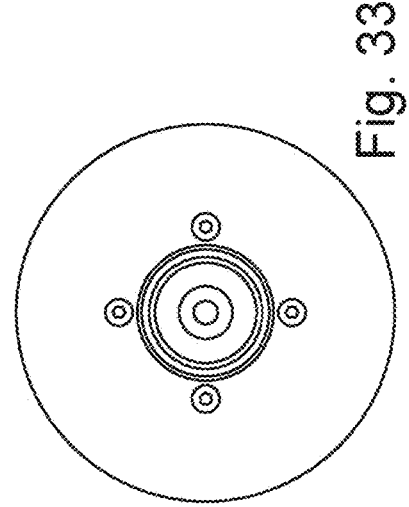
FIG. 33 is a lower plan view of the rotor of FIG. 30.
Figure 30:
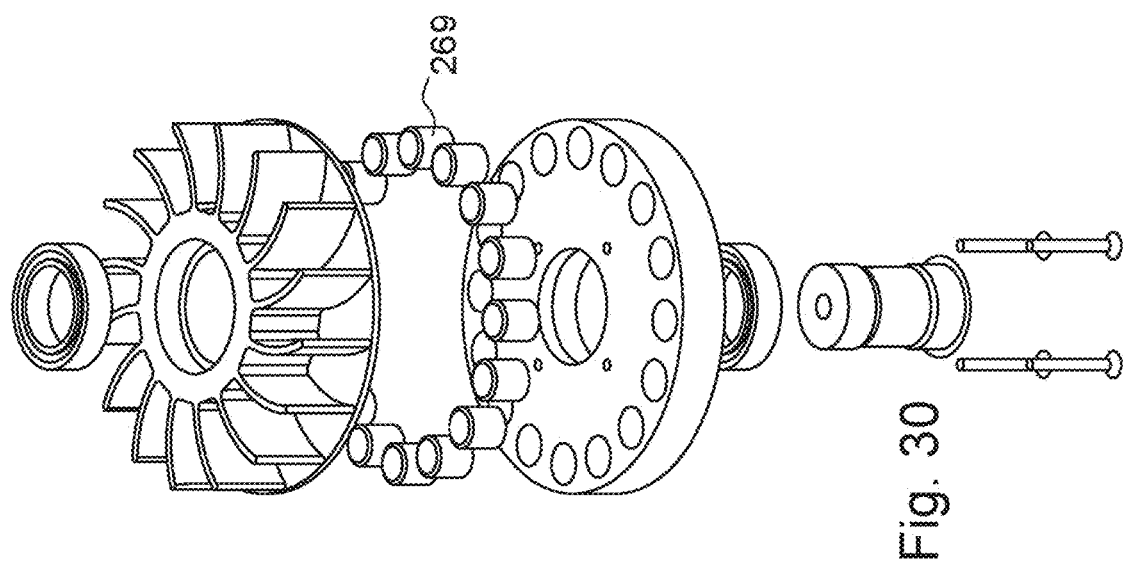
FIG. 30 is a further exploded perspective view of the vapour compression pump of the apparatus of FIG. 23.
Figure 36:
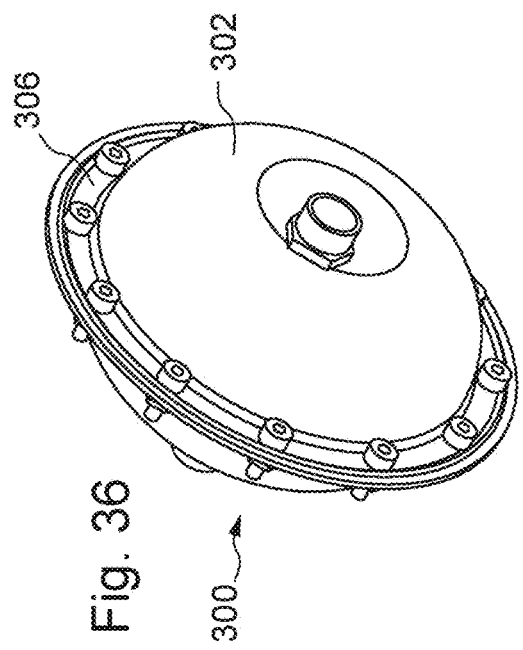
FIG. 36 is a perspective view of a dosing pump of the apparatus of FIG. 23.
Figure 37:
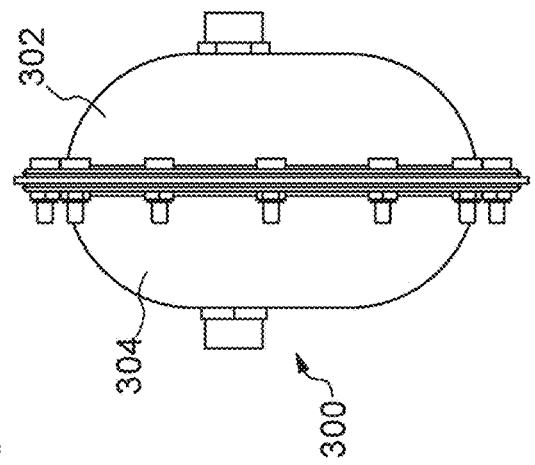
FIG. 37 is a side elevation of the dosing pump of FIG. 36.
Figure 38:
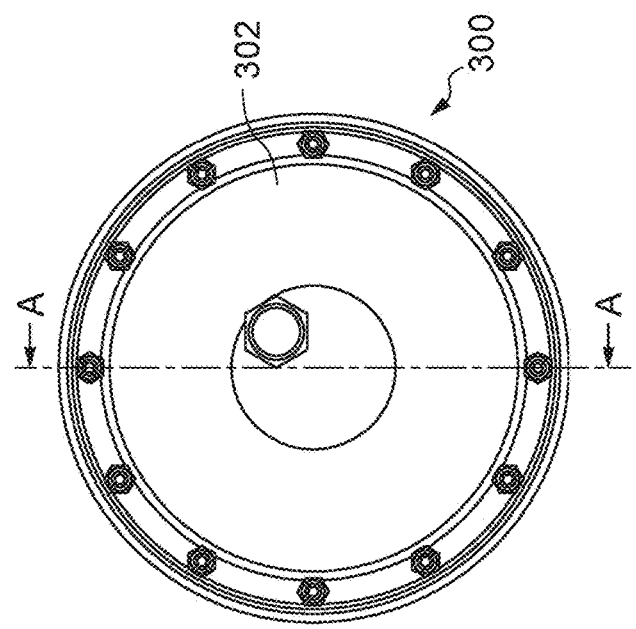
FIG. 38 is an end elevation of the dosing pump of FIG. 36.
Figure 39:
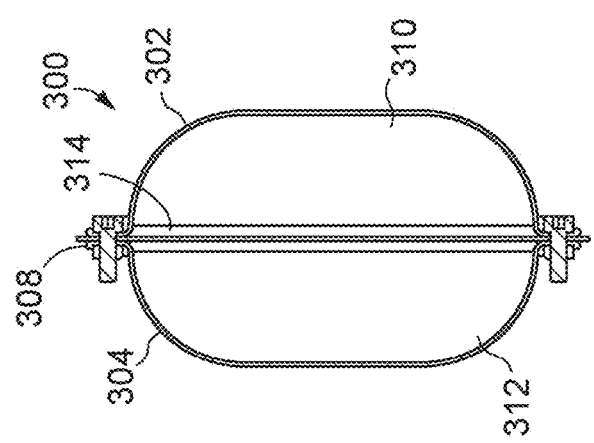
FIG. 39 is a sectional side elevation of the dosing pump of FIG. 36.
Figure 48:
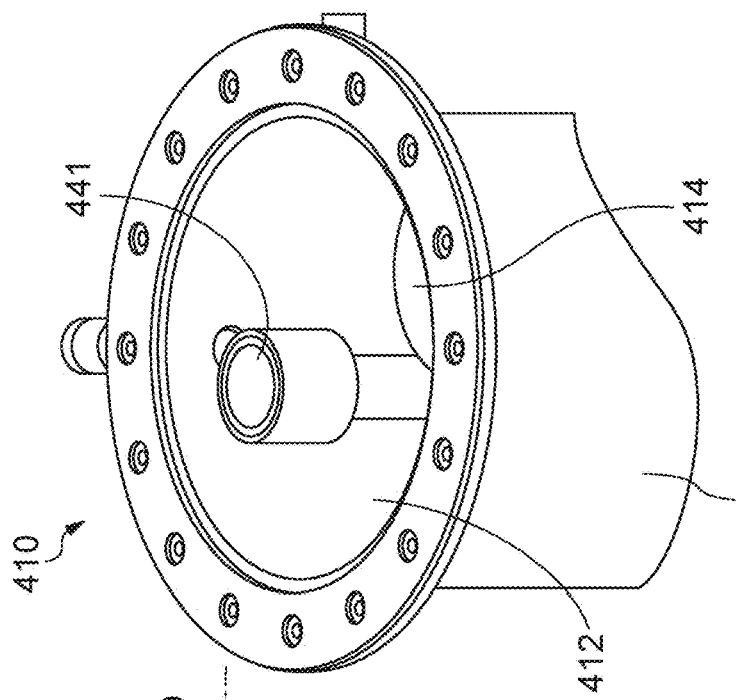
FIG. 48 is a perspective detail view of FIG. 48.
Figure 47:
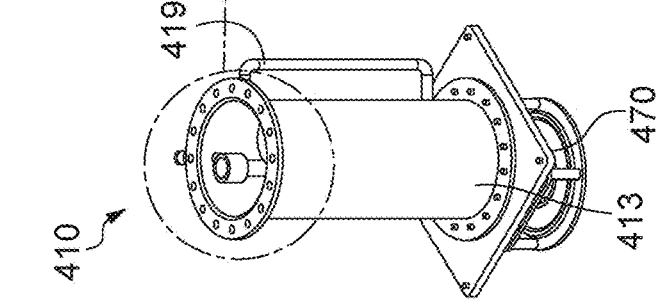
FIG. 47 is a perspective view of the apparatus of FIG. 40.
Figure 46:
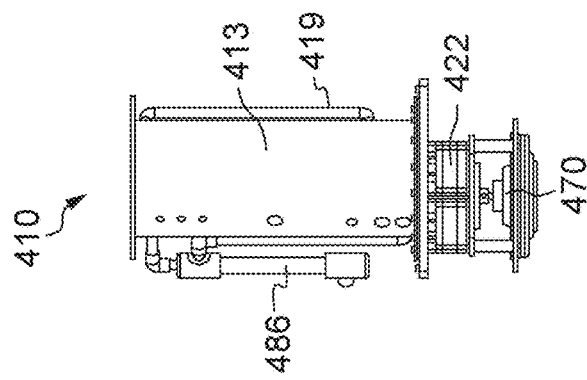
FIG. 46 is a further end elevation of the apparatus of FIG. 40.
Figure 45:
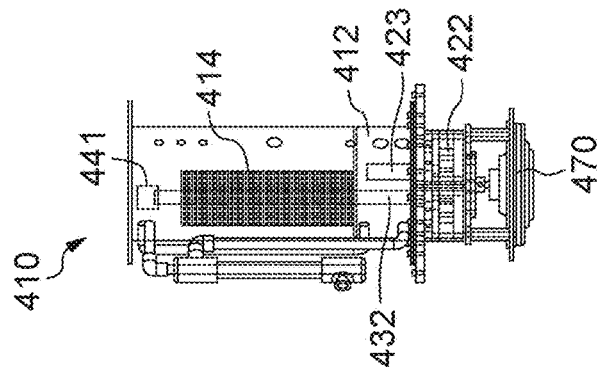
FIG. 45 is a further side elevation of the apparatus of FIG. 40.

An exploded view of the vapour compression pump 222 of the second embodiment apparatus is shown in FIG. 29. The vapour compression pump 222 is a liquid ring pump 222. The liquid ring pump 222 comprises a pump body 236, a pump compression chamber 238 provided within the pump body 236 and a rotor 240 mounted within the compression chamber 238. A ceramic bearing 244 is used to mount the rotor 240.

The pump body 236 comprises a main lobed body part 246, a primary upper cap 248, a secondary upper cap 250, the bearing outer race 252, a lower cap 254 made of borosilicate glass, a flanged disk 256 and a lower mounting plate 257. Four O-ring rubber seals 259 are provided; one between the primary upper cap 248 and secondary upper cap 250; one between the primary upper cap 248 and the main lobed body part 246; one between the main lobed body part 246 and the bearing outer race 252; and one between the bearing outer race 252 and the lower cap 254.

The main lobed body part 246 has four lobed lugs 247 provided around its exterior surface. Corresponding lobed lugs are provided on the primary upper cap 248 and the bearing outer race 252. The secondary upper cap 250 is provided with sixteen lobes, which corresponds with bores provided on the flanged disk 256 and lower mounting plate 257. The bores and lobes cooperate to allow the various components to be mechanically fastened together.

A magnet boss 266 is provided at the base of the rotor 240. In the present embodiment, it accounts for approximately 20% of the thickness of the rotor 240 and provides a close but sliding fit with an interior bore 268 provided on the body part 248. The bore 268 provides part of the compression chamber 238. A plurality of rotor magnets 269 are provided around the circumferential edge of the magnet boss 266. There are sixteen rotor magnets 269 equally spaced around the magnet boss 266. They are orientated with alternating poles i.e. N-S, S-N, N-S, etc. They are samarium high temperature magnets in the present embodiment, which offers a strong magnetic attraction and is chemically stable so would not contaminate the liquid being distilled. Other magnets may be used, for example Samarium-cobalt, GBD Neo or neodymium-iron-boron, which offer both high temperature and chemical stability.

A corresponding motor (not shown) and transmission element (not shown) similar to that described for the first embodiment apparatus are provided to enable magnetically impelled rotation of the rotor.

Rotor 240 is of a typical shape of a liquid ring pump 222, comprising a central boss 240a from which extend a plurality of curved vanes 240b. The rotor 240 is generally circular and rotating within the offset confines of the compression chamber 238 tends to cause a compression towards one side and a vacuum towards the other; this follows the general flow from input to output port.

A dosing pump 300 is provided for the second embodiment apparatus 210. The dosing pump 300 is a simple diaphragm pump 300. The pump 300 comprises two generally hemispherical body parts 302, 304 each with an outer flange 306, 308. The flanges 306, 308 are attached by nuts and bolts to connect the two parts of the pump together. Two interior chambers 310, 312 separated by a flexible membrane 314. Fluid entering one side of the pump 300 pushes the exact same amount of fluid out of the other side of the pump 300.

Thus, the same fluid can be removed from the condensation chamber and pushed into the evaporation chamber in one alternating process. Three-way valves are used to control the input and output on both sides of the pump 300. The dosing pump 300 is connected to the other side of the pre-distillation heat exchanger 282.

The dosing pump 300 may also be used in conjunction with the first embodiment described above.

In the second embodiment, inlet fluid passes through the pre-distillation heat exchanger 282 where heat transfer from the outlet fluid occurs. The inlet fluid passes into the fluid 212 located at the upper portion of the apparatus 210. The inlet fluid flows into the evaporation chamber 212 where it is heated and begins to vaporise with the vapour rising to the upper portion of the evaporation chamber. Pre-distilled inlet fluid will surround the pipe condensers 226 with heat transfer taking place from the hotter condensers 226.

The liquid ring pump 222 creates a pressure differential which draws the vapour down the vapour conduit 236 where it is directed via a projecting discharge pipe (not shown—see third embodiment below for description) into the lower condensation chamber 217 and pipe condensers 226. The vapour condenses into distilled liquid and is collected in the lower condensation chamber 217 beneath the evaporator/condenser assembly and above the liquid ring pump 222. The liquid may then be drawn from the apparatus 210 through the pre-distillation heat exchanger 282.

A third embodiment apparatus 410 is depicted in FIGS. 40 to 44.

Similarly functioning parts of the third embodiment are numbered with
a similar numbering scheme albeit prefixed with a "4". For example, vacuum pump 422 and motor 470. These will not be described further where they function as the integers described in the first embodiment but will be further elaborated below where there are differences.

The third embodiment apparatus is generally similar to the second embodiment, comprising an evaporation chamber 412, a condensation chamber 414, a heat source 416, the heat source 416 being arranged to supply heat to at least part of the evaporation chamber 412, a fluid inlet 418, a fluid outlet 420, and a vapour compression pump 422, wherein the evaporation chamber 412 surrounds at least part of the condensation chamber 414. A cylindrical outer housing (omitted for clarity) houses the various components.

The condensation chamber 414 comprises a lower condensation chamber 417 and a single cylindrical condenser 426 provided in the distillation apparatus 410. Although being a larger diameter, the single cylindrical condenser 426 is otherwise similar to the second embodiment pipe condenser. Again, heat transfer is possible between the inlet fluid in the evaporation chamber 412 and the fluid condensing in the condensation chamber 426.

Corrugated internal heat transfer surfaces (not shown) are provided to provide greater surface area over which the distilled vapour may condense.

A pancake motor 470 is used to drive the liquid ring pump 422 through the magnetic transmission element.

The outlet port of the liquid ring pump 422 is directed towards a vapour outlet pipe 423. The vapour outlet pipe 423 projects into the lower condensation chamber 417. This prevents condensed distillate from flowing back into the liquid ring pump 422. A similar arrangement is also present in the first embodiment 10 and second embodiment 210.

The heat source 416 is an electrical heating element 416 arranged within the evaporation chamber 412.

A droplet separator 441 is attached to the upper portion of the vapour conduit 432. The droplet separator 441 comprises a mesh cup 441 which covers the open upper end of the vapour conduit 432. As can be seen from FIG. 43, the fluid inlet 418 is adjacent the vapour conduit 432 and the droplet separator 441 mitigates the possibility of pre-distilled liquid from entering the liquid ring pump 422 and thereby compromising the purity of the distilled output liquid.

A bypass valve assembly 419 is provided on the third embodiment (and may be considered as identical to that provided on the first embodiment and second embodiment 210). The bypass valve assembly 419 comprises a pipe which connects the upper head space of the evaporation chamber 412 with the lower condensation chamber 417 with a valve (not shown) being located within the pipe. The bypass valve assembly 419 allows the pressure to be equalised between these two chambers. The third embodiment may also include a dosing pump 300 as described above.

Each of the described embodiments may be provided with sensors monitoring various operating conditions within the system, such as pH of water, temperatures, pressures, motor speeds, Parts Per Million (PPM) contaminants, Total Dissolved Solids (TDS) and so forth, and this may be used to monitor the operation of the apparatus or may be used as control inputs to control the operation of the system.

Each of the described embodiments may be provided with cleansing modifications, such that the evaporation, condensation and/or spill over tanks may be cleaned using, for example, chemical cleansers, physical scrubbing cleansers and so forth.

It will be apparent that the apparatus may be used to distil any aqueous solution or mixture that it may be advantageous to do so with, such as alcoholic beverages.

Moreover, since output water may be at an elevated temperature, the distillation apparatus may be used, or combined within further apparatus to create suitable apparatus for, the production of distilled water for cooking, drinking (with tea, coffee or the like), bathing, swimming, etc.

System Startup Procedure

If the evaporator and/or the distiller have air in them it would function as a buffer gas creating constant back pressure that the steam compressor would have to overcome without producing any distillation. Therefore, it is very important to have both evaporator and the distiller to have only steam atmosphere inside and evacuate any buffer gas (air) that may be trapped in the system. There are two main methods in achieving it:

Evacuate the air by boiling the liquid, running the compressor and venting the steam/air out of the chambers.
Alternatively, the system can have the air evacuated with a vacuum pump when cold during the installation.

Both approaches can be used in turns, i.e. the system can be vented when hot, but sealed when cooling down, which will create vacuum in it.

It is also very important to be able to detect if there is a buffer gas in the system as otherwise it would impede the efficiency of distillation.

Buffer Gas Detection Algorithm

The temperature and pressure of the steam in the system may be measured and can compare measured parameters against known physical properties tables. If the pressure in the system exceed that expected at that temperature, it means that the buffer gas is present and at a certain threshold level a venting procedure may be initiated. This:

Removes air from the system as it runs
Take the pressure vs temperature table, and check for the presence of buffer gas. If we find there is (air in the system) then we vent. This venting allows us to maintain efficiency and control the system.

Pump and Motor Procedure

If the steam compressor comes to a sudden halt the pressure differential can flush the distillate back into the evaporator. In order to 15 avoid that a particular sequence and mechanisms have to be implemented.

1) A bypass valve between the evaporator and the condenser is introduced in order to equalise the pressure in the condenser and 20 evaporator chambers.
2) Just before stopping the steam compressor the bypass valve may be opened and slowly reduce the RPMs of the pump.
3) If a sharp change in the pressure is detected that can be related to a failure mode, in particular the decoupling of the magnetic coupler in the steam compressor. In which case the safest action is to open the bypass valve and stop the steam compressor. Then to restart the machine.

Change in state

Need to close or open valves before or after starting or stopping the pump
Know if the pump is coupled or not and automatically fix itself The invention is not limited to the embodiments hereinbefore described but may be modified both in construction and detail. It will be readily apparent that features from individual embodiments may be combined to create new embodiments within the scope of the present invention.

For example, scraper systems may be added to the evaporation chambers in order to mitigate the build-up or solutes and contaminants that may be build up at the base of the evaporation chamber.

An electronic control system may be provided that measures the parameters and then optimises the apparatus based on those measurements. The parameters may include:

1. Water level, temperature, pressure in evaporation chamber 2. flow and temperature of the steam, pump's RPM and temperature in the cooling jacket.
3. Water level, temperature, pressure in condensation chamber.
4. Flow meter on distillate to water heat exchanger
5. Water level, temperature, pressure in expanding bladder tank.
6. fluid chiller, and chemical composition sensor before and after the mineralisation cartridge.

Which may be used to control: Pressure inside the evaporation chamber, pump's RPMs, cooling jacket fluid flow, distillate output, vent valve, fresh water inlet valve, dirty water inlet valve, distillate outlet valve, and the heater (for the start of the system).

In addition, the system may be provided with suitable refrigeration, with mineralisation cartridges to effect remineralisation of the distilled fluid, or indeed be provided with other suitable delivery systems to 10 provide fluid to, or transport fluid away from, the apparatus.

The invention claimed is:
1. A distillation apparatus comprising:
an evaporation chamber,
wherein the evaporation chamber includes:
  an inlet sump;
  a vapour chamber; and
a condensation chamber,
wherein:
the condensation chamber comprises a cylindrical chamber and the evaporation chamber is at least partially located within the condensation chamber; or
the evaporation chamber comprises a cylindrical chamber and the condensation chamber is at least partially located within the evaporation chamber;
a heat source, the heat source being arranged to supply heat to at least part of the evaporation chamber;
a fluid inlet;
a fluid outlet;
a vapour compression pump;
a vapour conduit connecting the evaporation chamber to the vapour compression pump,
wherein the vapour compression pump is located below the evaporation chamber or the condensation chamber; and
a bypass valve connecting part of the condensation chamber to part of the evaporation chamber.
2. The distillation apparatus according to claim 1, wherein the heat source surrounds the inlet sump.
3. The distillation apparatus according to claim 1, wherein at least one of:
the condensation chamber is provided with a corrugated internal surface; or
the condensation chamber is provided with internal fins.
4. The distillation apparatus according to claim 1, wherein the evaporation chamber includes one or more transit pipes.
5. The distillation apparatus according to claim 4, wherein at least one of:
the one or more transit pipes are located within the condensation chamber;
the one or more transit pipes are provided with heat transfer fins; or
the one or more transit pipes connect the inlet sump to the vapour chamber.
6. The distillation apparatus according to claim 1, wherein the vapour chamber is provided above the condensation chamber.
7. The distillation apparatus according to claim 1, where the heat source is provided within the evaporation chamber.
8. The distillation apparatus according to claim 1, wherein the fluid inlet is positioned beneath the condensation chamber.
9. The distillation apparatus according to claim 1, wherein the fluid inlet is positioned above the condensation chamber.
10. The distillation apparatus according to claim 1, wherein the vapour compression pump is a liquid ring pump.
11. The distillation apparatus according to claim 10, wherein the liquid ring pump comprises a pump body, a pump compression chamber provided within the pump body, a rotor mounted within the compression chamber, a rotor axle to mount said rotor, the rotor being provided with one or more ceramic bearings to mount the rotor to the rotor axle.
12. The distillation apparatus according to claim 11, further including a port and a line connecting the one or more ceramic bearings to a reservoir of distilled liquid.
13. The distillation apparatus according to claim 11, wherein the rotor includes one or more magnets,
  and wherein optionally a plurality of magnets are provided surrounding the rotor axle embedded within the body of the rotor.
14. The distillation apparatus according to claim 10, further including an electric motor to power the liquid ring pump.
15. The distillation apparatus according to claim 14, further including a magnetic transmission element coupled to the electric motor,
  and wherein optionally the magnetic transmission element comprises a motor ring with one or more magnets provided around the motor ring.
16. The distillation apparatus according to claim 1, wherein the vapour compression pump is a lubricating gerotor pump.
17. The distillation apparatus according to claim 1, wherein the vapour compression pump is a progressive cavity pump.
18. The distillation apparatus according to claim 1, wherein the vapour compression pump includes a rotor rotating on an axis, said axis being vertical.
19. The distillation apparatus according to claim 1, wherein the fluid inlet and the fluid outlet are fed through a pre-distillation heat exchanger,
  and wherein optionally the pre-distillation heat exchanger is located adjacent the condensation chamber.
20. The distillation apparatus according to claim 1, further including an expansion tank,
  and wherein optionally the expansion tank is located adjacent the condensation chamber.
21. The distillation apparatus according to claim 1, further including a dosing pump,
  and wherein optionally the dosing pump comprises two hemispherical body parts defining two interior chambers separated by a flexible membrane.

* * * * *